US012605824B2

(12) United States Patent
Ragusila et al.

(10) Patent No.: US 12,605,824 B2

(45) Date of Patent: Apr. 21, 2026

(54) HUMANOID ROBOT

(71) Applicant: FIGURE AI INC., Sunnyvale, CA (US)

(72) Inventors: Victor Ragusila, Sunnyvale, CA (US);
Mike Stevens, Sunnyvale, CA (US);
Corey Lynch, Sunnyvale, CA (US);
Yevgen Chebotar, Sunnyvale, CA (US)

(73) Assignee: FIGURE AI INC., San Jose, CA (US)

( * ) Notice: Subject to any disclaimer, the term of this
patent is extended or adjusted under 35
U.S.C. 154(b) by 0 days.

(21) Appl. No.: 19/064,596

(22) Filed: Feb. 26, 2025

(65) Prior Publication Data

US 2025/0269518 A1 Aug. 28, 2025

Related U.S. Application Data

(60) Provisional application No. 63/760,617, filed on Feb.
19, 2025, provisional application No. 63/696,507,
(Continued)

(51) Int. Cl.
*B25J 9/00* (2006.01)
*B25J 15/10* (2006.01)
*B62D 57/032* (2006.01)

(52) U.S. Cl.
CPC ............. *B25J 9/0087* (2013.01); *B25J 15/10*
(2013.01); *B62D 57/032* (2013.01)

(58) Field of Classification Search
CPC ...... B25J 9/0006; B25J 9/0045; B25J 9/0087;
B25J 9/1612; B25J 9/1669; B25J 9/1682;
(Continued)

(56) References Cited

U.S. PATENT DOCUMENTS 4,804,220 A 2/1989 Rosheim
4,834,761 A 5/1989 Walters
(Continued)

FOREIGN PATENT DOCUMENTS

CN 102357889 2/2012
CN 308637925 5/2014
(Continued)

OTHER PUBLICATIONS

Zhou et al., "Watch, Try, Learn: Meta-Learning From Demonstrations and Rewards," arXiv:1906.03352v4 [cs.LG] Jan. 30, 2020.
(Continued)

*Primary Examiner* — Saul Rodriguez
*Assistant Examiner* — Brendan P Tighe

(57) ABSTRACT

A humanoid robot includes a torso, a left arm assembly coupled to the torso and having a first reference line, a left wrist coupled to the left arm assembly and including at least a rotational axis, and a left end effector coupled to the left wrist. The left end effector is configured to move about the rotational axis and includes a finger assembly with a second reference line and at least two degrees of freedom, and a thumb assembly with at least three degrees of freedom. A first angle is formed between the first and second reference lines when the left wrist is in a first configuration, and a second angle is formed when the left wrist is in a second configuration. Both the first and second angles are greater than 70 degrees, and the difference between the first and second angles is greater than 150 degrees.

24 Claims, 13 Drawing Sheets

Related U.S. Application Data filed on Sep. 19, 2024, provisional application No. 63/696,533, filed on Sep. 19, 2024, provisional application No. 63/692,747, filed on Sep. 10, 2024, provisional application No. 63/690,334, filed on Sep. 4, 2024, provisional application No. 63/557,874, filed on Feb. 26, 2024.

(58) Field of Classification Search
CPC .. B25J 9/1694; B25J 11/0015; B25J 15/0038; B25J 15/0009; B25J 15/10; B25J 17/0241; B62D 57/032
See application file for complete search history.

(56) References Cited

U.S. PATENT DOCUMENTS

| | | | |
|---|---|---|---|
| 4,986,723 | A | 1/1991 | Maeda |
| 5,394,766 | A | 3/1995 | Johnson |
| 5,447,403 | A | 9/1995 | Engler, Jr. |
| 5,673,367 | A | 9/1997 | Buckley |
| 6,477,058 | B1 | 11/2002 | Luebs |
| 6,732,015 | B2 | 5/2004 | Maeda |
| 6,980,889 | B2 | 12/2005 | Ito |
| 7,024,276 | B2 | 4/2006 | Ito |
| 7,072,741 | B2 | 7/2006 | Nagashima |
| 7,099,747 | B2 | 8/2006 | Mikami |
| 7,308,336 | B2 | 12/2007 | Takenaka |
| 7,319,918 | B2 | 1/2008 | Takenaka |
| 7,379,789 | B2 | 5/2008 | Takenaka |
| 7,386,364 | B2 | 6/2008 | Mikami |
| 7,664,569 | B2 | 2/2010 | Shimizu |
| 7,864,159 | B2 | 1/2011 | Sweetser |
| D641,808 | S | 7/2011 | Matsuda |
| 8,224,652 | B2 | 7/2012 | Wang |
| D677,743 | S | 3/2013 | Koshiishi |
| D687,908 | S | 8/2013 | Hoang |
| 8,511,964 | B2 | 8/2013 | Linn |
| D689,566 | S | 9/2013 | Wong |
| 8,660,695 | B2 | 2/2014 | De La Rosa Tames |
| 8,770,749 | B2 | 7/2014 | Mccabe |
| 8,942,849 | B2 | 1/2015 | Maisonnier |
| 8,977,388 | B2 * | 3/2015 | Jacobsen ................ B66C 1/425 |
| | | | 318/568.22 |
| 9,134,547 | B2 | 9/2015 | Mccabe |
| 9,205,556 | B1 | 12/2015 | Magnusson |
| 9,205,560 | B1 | 12/2015 | Edsinger |
| 9,346,165 | B1 | 5/2016 | Metzger |
| 9,383,594 | B2 | 7/2016 | Mccabe |
| 9,494,415 | B2 | 11/2016 | Sweetser |
| 9,569,976 | B2 | 2/2017 | Krauss |
| 9,574,646 | B1 | 2/2017 | Edsinger |
| 9,575,335 | B1 | 2/2017 | Mccabe |
| 9,592,603 | B2 | 3/2017 | Hardouin |
| D794,692 | S | 8/2017 | Haranaka |
| D795,320 | S | 8/2017 | Liu |
| D795,321 | S | 8/2017 | Liu |
| 9,789,607 | B1 | 10/2017 | Whitman |
| 9,789,612 | B2 | 10/2017 | Hoffman |
| 9,796,078 | B2 | 10/2017 | Angle |
| 9,821,466 | B2 | 11/2017 | Bingham |
| 9,842,585 | B2 | 12/2017 | Huang |
| 9,868,210 | B1 | 1/2018 | Whitman |
| 9,910,297 | B1 | 3/2018 | Mccabe |
| 9,992,474 | B2 | 6/2018 | Grunnet-Jepsen |
| 10,007,994 | B2 | 6/2018 | Grunnet-Jepsen |
| 10,018,256 | B1 | 7/2018 | Magnusson |
| D835,214 | S | 12/2018 | Xiong |
| D838,759 | S | 1/2019 | Kowalski |
| 10,189,158 | B2 | 1/2019 | Edsinger |
| D841,708 | S | 2/2019 | Koshiishi |
| 10,203,209 | B2 | 2/2019 | Roumeliotis |
| 10,310,362 | B2 | 6/2019 | Grunnet-Jepsen |
| 10,349,245 | B2 | 7/2019 | Tokuchi |
| D866,684 | S | 11/2019 | Michael |
| D868,866 | S | 12/2019 | Gable |
| D872,152 | S | 1/2020 | Xiong |
| D873,320 | S | 1/2020 | Clerc |
| 10,537,998 | B2 | 1/2020 | Salisbury |
| 10,545,497 | B1 | 1/2020 | Cui |
| 10,571,896 | B2 | 2/2020 | Benaim |
| D885,451 | S | 5/2020 | Chen |
| 10,656,511 | B2 | 5/2020 | Grunnet-Jepsen |
| D888,120 | S | 6/2020 | Hurst |
| D892,886 | S | 8/2020 | Klassen |
| D892,887 | S | 8/2020 | Klassen |
| D893,573 | S | 8/2020 | Yan |
| 10,780,578 | B2 | 9/2020 | Blankespoor |
| D898,789 | S | 10/2020 | Nazarikhorram |
| 10,890,921 | B2 | 1/2021 | Gillett |
| D911,459 | S | 2/2021 | Xiong |
| 10,921,558 | B2 | 2/2021 | Yao |
| 10,924,638 | B2 | 2/2021 | Swaminathan |
| 10,946,528 | B2 | 3/2021 | Gupta |
| 10,960,539 | B1 | 3/2021 | Kalakrishnan |
| D932,531 | S | 10/2021 | Xu |
| 11,180,205 | B2 | 11/2021 | Amino |
| 11,188,821 | B1 | 11/2021 | Kalakrishnan |
| 11,247,738 | B2 | 2/2022 | Lavalley |
| 11,333,954 | B2 | 5/2022 | Bull |
| 11,347,030 | B2 | 5/2022 | Yao |
| 11,402,726 | B2 | 8/2022 | Bull |
| 11,416,003 | B2 | 8/2022 | Whitman |
| 11,435,745 | B2 | 9/2022 | Lee |
| 11,498,223 | B2 | 11/2022 | Williams |
| 11,546,504 | B2 | 1/2023 | Kim |
| 11,554,484 | B2 | 1/2023 | Jung |
| 11,599,009 | B2 | 3/2023 | Bull |
| 11,600,010 | B2 | 3/2023 | Doutre |
| 11,602,853 | B2 | 3/2023 | Stoianovici |
| 11,632,991 | B2 | 4/2023 | Hull |
| D985,643 | S | 5/2023 | Li |
| 11,645,444 | B2 | 5/2023 | Scheutz |
| 11,686,884 | B2 | 6/2023 | Shinohara |
| 11,699,884 | B2 | 7/2023 | Braun |
| 11,707,852 | B1 * | 7/2023 | Hurst .................... B25J 13/081 |
| | | | 74/490.01 |
| 11,736,677 | B2 | 8/2023 | Grunnet-Jepsen |
| 11,807,067 | B2 | 11/2023 | Mancini |
| 11,833,680 | B2 | 12/2023 | Deits |
| 11,850,738 | B2 | 12/2023 | Chernyak |
| 11,851,120 | B2 | 12/2023 | Fay |
| 11,999,423 | B2 | 6/2024 | Whitman |
| 12,036,670 | B2 | 7/2024 | Geating |
| 12,054,208 | B2 | 8/2024 | Swilling |
| 12,070,863 | B2 | 8/2024 | Whitman |
| 12,077,229 | B2 | 9/2024 | Whitman |
| 12,097,626 | B2 | 9/2024 | Ikeda |
| 12,122,044 | B2 | 10/2024 | Webb |
| D1,051,193 | S | 11/2024 | Mahoor |
| 12,134,181 | B2 | 11/2024 | Klingensmith |
| 12,172,537 | B2 | 12/2024 | Gonano |
| 12,205,214 | B2 | 1/2025 | Starke |
| 12,214,497 | B2 | 2/2025 | Whitman |
| 12,235,652 | B2 | 2/2025 | Whitman |
| 12,240,117 | B2 | 3/2025 | Chebotar |
| 12,246,441 | B1 * | 3/2025 | Abate .................... B25J 9/0009 |
| 12,251,831 | B2 | 3/2025 | Murphy |
| D1,069,875 | S | 4/2025 | Belon |
| 12,290,940 | B1 | 5/2025 | Abate |
| D1,082,881 | S | 7/2025 | Wang |
| 12,365,094 | B2 | 7/2025 | Mccall |
| 12,403,611 | B2 | 9/2025 | Mccall |
| 12,472,648 | B1 | 11/2025 | Hadas |
| 2004/0075168 | A1 | 4/2004 | Azuma |
| 2004/0103740 | A1 | 6/2004 | Townsend |
| 2005/0072558 | A1 | 4/2005 | Whitney |
| 2006/0217838 | A1 | 9/2006 | Sugino |
| 2007/0035143 | A1 | 2/2007 | Blackwell |
| 2008/0239678 | A1 | 10/2008 | Ploeg |
| 2008/0240889 | A1 * | 10/2008 | Yokoyama ............. B25J 9/1612 |
| | | | 414/800 |
| 2009/0059033 | A1 | 3/2009 | Shimada |
| 2010/0280662 | A1 | 11/2010 | Abdallah |
| 2011/0058800 | A1 | 3/2011 | Lee |

(56) References Cited

U.S. PATENT DOCUMENTS

| | | | |
|---|---|---|---|
| 2011/0067517 A1* | 3/2011 | Ihrke | B25J 17/025 |
| | | | 74/490.03 |
| 2011/0067520 A1 | 3/2011 | Ihrke | |
| 2011/0068595 A1 | 3/2011 | Ihrke | |
| 2011/0071671 A1 | 3/2011 | Ihrke | |
| 2011/0071673 A1 | 3/2011 | Ihrke | |
| 2011/0071678 A1 | 3/2011 | Ihrke | |
| 2012/0072215 A1 | 3/2012 | Yu | |
| 2012/0078419 A1* | 3/2012 | Kim | B25J 9/1669 |
| | | | 700/255 |
| 2012/0155775 A1 | 6/2012 | Ahn | |
| 2012/0215539 A1 | 8/2012 | Juneja | |
| 2012/0310412 A1 | 12/2012 | Seo | |
| 2013/0175816 A1 | 7/2013 | Kawasaki | |
| 2013/0345863 A1 | 12/2013 | Linder | |
| 2014/0039675 A1 | 2/2014 | Ead | |
| 2014/0217762 A1 | 8/2014 | Ihrke | |
| 2014/0265401 A1 | 9/2014 | Allen Demers | |
| 2015/0192399 A1 | 7/2015 | Raab | |
| 2015/0290795 A1 | 10/2015 | Oleynik | |
| 2016/0008988 A1 | 1/2016 | Kennedy | |
| 2016/0052574 A1 | 2/2016 | Khripin | |
| 2016/0059412 A1* | 3/2016 | Oleynik | G05B 19/42 |
| | | | 700/250 |
| 2016/0064263 A1 | 3/2016 | Hosek | |
| 2017/0028563 A1 | 2/2017 | Hemken | |
| 2017/0032035 A1* | 2/2017 | Gao | G06N 3/0495 |
| 2017/0075143 A1 | 3/2017 | Saylor | |
| 2017/0080582 A1 | 3/2017 | Mugnier | |
| 2017/0106738 A1 | 4/2017 | Gillett | |
| 2017/0125008 A1 | 5/2017 | Maisonnier | |
| 2017/0299898 A1 | 10/2017 | Gallina | |
| 2017/0326736 A1 | 11/2017 | Nagatsuka | |
| 2017/0348854 A1* | 12/2017 | Oleynik | A47J 47/02 |
| 2018/0104823 A1 | 4/2018 | Kaku | |
| 2018/0136912 A1 | 5/2018 | Venkataramani | |
| 2018/0182260 A1 | 6/2018 | Ciniello | |
| 2018/0232201 A1 | 8/2018 | Holtmann | |
| 2018/0293517 A1* | 10/2018 | Browne | G06N 3/105 |
| 2018/0357552 A1* | 12/2018 | Campos | G06N 3/0499 |
| 2019/0025611 A1 | 1/2019 | Saylor | |
| 2019/0079924 A1 | 3/2019 | Sugiura | |
| 2019/0100263 A1 | 4/2019 | Amino | |
| 2019/0105783 A1 | 4/2019 | Al Moubayed | |
| 2019/0278079 A1 | 9/2019 | Mccabe | |
| 2019/0291277 A1* | 9/2019 | Oleynik | B25J 9/1669 |
| 2019/0329413 A1 | 10/2019 | Johnson | |
| 2019/0337166 A1 | 11/2019 | Keeney-Ritchie | |
| 2019/0371307 A1 | 12/2019 | Zhao | |
| 2020/0009739 A1 | 1/2020 | Moon | |
| 2020/0086479 A1 | 3/2020 | Messier | |
| 2020/0096792 A1 | 3/2020 | Mccabe | |
| 2020/0330246 A1 | 10/2020 | Tognetti | |
| 2020/0409183 A1 | 12/2020 | Saylor | |
| 2021/0162602 A1 | 6/2021 | Kawaguchi | |
| 2021/0221004 A1 | 7/2021 | Gupta | |
| 2021/0387346 A1 | 12/2021 | Gillett | |
| 2022/0226996 A1 | 7/2022 | Ishizuka | |
| 2022/0258342 A1* | 8/2022 | Gildert | B25J 9/1661 |
| 2022/0287853 A1 | 9/2022 | Ren | |
| 2022/0294062 A1 | 9/2022 | Kamon | |
| 2022/0388174 A1 | 12/2022 | Stathis | |
| 2022/0390952 A1 | 12/2022 | Yu | |
| 2022/0395974 A1 | 12/2022 | Balasubramanian | |
| 2022/0410380 A1 | 12/2022 | Lu | |
| 2023/0031545 A1* | 2/2023 | Oleynik | B25J 11/009 |
| 2023/0033779 A1 | 2/2023 | Gazeau | |
| 2023/0048725 A1* | 2/2023 | Barbour | G06F 18/214 |
| 2023/0112596 A1 | 4/2023 | Yang | |
| 2023/0143315 A1 | 5/2023 | Whitman | |
| 2023/0154055 A1* | 5/2023 | Besenbruch | G06N 3/092 |
| | | | 375/240.03 |
| 2023/0173683 A1 | 6/2023 | Gomez | |
| 2023/0182296 A1 | 6/2023 | Sermanet | |
| 2023/0347514 A1 | 11/2023 | Xiao | |

| | | | |
|---|---|---|---|
| 2023/0390948 A1 | 12/2023 | Hsu | |
| 2024/0003380 A1 | 1/2024 | Vyas | |
| 2024/0091964 A1 | 3/2024 | Smith | |
| 2024/0181637 A1 | 6/2024 | Gillett | |
| 2024/0217104 A1 | 7/2024 | Neville | |
| 2024/0228191 A1 | 7/2024 | Kumar | |
| 2024/0253243 A1* | 8/2024 | Gildert | B25J 9/1653 |
| 2024/0289606 A1* | 8/2024 | Wang | G06N 3/0455 |
| 2024/0300109 A1 | 9/2024 | Shaw | |
| 2024/0430464 A1* | 12/2024 | Kalva | H04L 65/752 |
| 2025/0042024 A1* | 2/2025 | Dijkman | B25J 9/161 |
| 2025/0050507 A1* | 2/2025 | Camasmie | B25J 9/163 |
| 2025/0147517 A1 | 5/2025 | Swilling | |
| 2025/0187202 A1 | 6/2025 | Mccall | |
| 2025/0196326 A1 | 6/2025 | Katz | |
| 2025/0196327 A1 | 6/2025 | Geating | |
| 2025/0205908 A1 | 6/2025 | Goldsmith | |

FOREIGN PATENT DOCUMENTS

| | | |
|---|---|---|
| CN | 303298408 | 7/2015 |
| CN | 209615545 | 11/2019 |
| CN | 210998685 | 7/2020 |
| CN | 212287717 | 1/2021 |
| CN | 112959343 | 6/2021 |
| CN | 115503013 | 12/2022 |
| CN | 115649316 | 1/2023 |
| CN | 218802294 | 4/2023 |
| CN | 116714698 | 9/2023 |
| CN | 117047810 | 11/2023 |
| CN | 117301022 | 12/2023 |
| CN | 117462367 | 1/2024 |
| CN | 309012925 | 12/2024 |
| GB | 2472046 | 4/2013 |
| GB | 2496335 | 5/2013 |
| JP | 1301180 | 5/2007 |
| JP | D1638014 | 7/2019 |
| JP | 1698172 | 10/2021 |
| KR | 20180107353 | 10/2018 |
| KR | 300994127 | 2/2021 |
| KR | 3020240036125 | 9/2024 |
| SU | 1734994 | 5/1992 |
| WO | 2009030922 | 3/2009 |
| WO | 2019234706 | 12/2019 |
| WO | 2022207106 | 10/2022 |
| WO | 2023107501 | 6/2023 |
| WO | 2023110778 | 6/2023 |
| WO | 2023246994 | 12/2023 |
| WO | 2023246995 | 12/2023 |
| WO | 2024058844 | 3/2024 |
| WO | 2024072966 | 4/2024 |
| WO | 2024085904 | 4/2024 |
| WO | 2024112350 | 5/2024 |
| WO | 2024112351 | 5/2024 |
| WO | 2024123766 | 6/2024 |
| WO | 2024163992 | 8/2024 |
| WO | D243074010 | 10/2024 |
| WO | 2025019583 | 1/2025 |
| WO | 2025042802 | 2/2025 |
| WO | 2025072321 | 4/2025 |

OTHER PUBLICATIONS

Li et al., "Supervision Exists Everywhere: A Data Efficient Contrastive Language-Image Pre-Training Paradigm," arXiv:2110.05208v2 [cs.CV] Mar. 14, 2022.

Xiong et al., "Learning by Watching: Physical Imitation of Manipulation Skills from Human Videos," arXiv:2101.07241v2 [cs.RO] Nov. 14, 2021.

Barker et al., Natural head movement for HRI with a muscular-skeletal head and neck robot, 2017, IEEE, p. 587-592 (Year: 2017).

Gao et al., Development of a low motion-noise humanoid neck: Statics analysis and experimental validation, 2010, IEEE, p. 1203-1208 (Year: 2010).

International Search Report for PCT/US2025/012544.

International Search Report for PCT/US2025/010425.

International Search Report for PCT/US2025/011450.

(56)　　　　　References Cited

OTHER PUBLICATIONS

Keselman et al., "Intel RealSense stereoscopic depth cameras," in Proceedings of the IEEE Conference on Computer Vision and Pattern Recognition Workshops, pp. 1-10, 2017.

Brown et al., "Language Models are Few-Shot Learners," arXiv:2005. 14165v4 [cs.CL] Jul. 22, 2020.

Chang et al., "A Survey on Evaluation of Large Language Models," ACM Trans. Intell. Syst. Technol., vol. 15, No. 3, Article 39. Publication date: Mar. 2024.

Chen et al., "InternVL: Scaling up Vision Foundation Models and Aligning for Generic Visual-Linguistic Tasks," https://github.com/OpenGVLab/InternVL (2024).

Gia et al., "Densely Connected Feature Pyramid Network for Image Segmentation," 2020 8th International Conference on Digital Home (ICDH).

Jin et al., "Unified Language-Vision Pretraining in LLM With Dynamic Discrete Visual Tokenization," arXiv:2309.04669v3 [cs. CV] Mar. 22, 2024.

Kim et al., "Parallel Feature Pyramid Network for Object Detection," ECCV 2018.

Kim et al., "Giving Robots a Hand: Learning Generalizable Manipulation with Eye-in-Hand Human Video Demonstrations," arXiv:2307. 05959v1 [cs.RO] Jul. 12, 2023.

Kirillov et al., "Panoptic Feature Pyramid Networks," IEEE Xplore (2018).

Lee et al., "Learning Robot Activities from First-Person Human Videos Using Convolutional Future Regression," IEEE Xplore (2017).

Li et al., BLIP: Bootstrapping Language-Image Pre-training for Unified Vision-Language Understanding and Generation, Proceedings of the 39 th International Conference on Machine Learning, Baltimore, Maryland, USA, PMLR 162, 2022.

Lin et al., "Feature Pyramid Networks for Object Detection," IEEE Xplore (2016).

Lin et al., "Feature Pyramid Networks for Object Detection," IEEE Xplore (2024).

Liu et al., "A Survey of Attacks on Large Vision-Language Models: Resources, Advances, and Future Trends," Journal of Latex Class Files, vol. 14, No. 8, Aug. 2021.

Liu et al., "Imitation from Observation: Learning to Imitate Behaviors from Raw Video via Context Translation," arXiv:1707.03374v2 [cs.LG] Jun. 18, 2018.

Liu et al., "RoBERTa: A Robustly Optimized BERT Pretraining Approach," arXiv:1907.11692v1 [cs.CL] Jul. 26, 2019.

Liu et al., "Improved Baselines with Visual Instruction Tuning," IEEE Xplore (2024).

Liu et al., "Visual Instruction Tuning," 37th Conference on Neural Information Processing Systems (NeurIPS 2023).

Lin et al., "VILA: On Pre-training for Visual Language Models," https://github.com/Efficient-Large-Model/VILA (2024).

Mandi et al., "Towards More Generalizable One-shot Visual Imitation Learning," bencharXiv:2110.13423v2 [cs.RO] Feb. 8, 2022.

Maniparambil et al., "Do Vision and Language Encoders Represent the World Similarly?" IEEE Xplore (2024).

Nvidia "Object Detection Synthetic DataGeneration," Nvidia Corporation, Nov. 9, 2024.

Nvidia "Object Detection Synthetic DataGeneration," Nvidia Corporation, Nov. 9, 2024 (URL).

Peng et al., "DeepMimic: Example-Guided Deep Reinforcement Learning of Physics-Based Character Skills," ACM Trans. Graph., vol. 37, No. 4, Article 143. Publication date: Aug. 2018.

Radford et al., "Improving Language Understanding by Generative Pre-Training," 2018.

Radford et al., "Language Models are Unsupervised Multitask Learners," 2019.

Radford et al., "Learning Transferable Visual Models From Natural Language Supervision," Proceedings of the 38 th International Conference on Machine Learning, PMLR 139, 2021.

Raffel et al., "Exploring the Limits of Transfer Learning with a Unified Text-to-Text Transformer," Journal of Machine Learning Research 21 (2020) 1-67.

Ramachandruni et al., "Attentive Task-Net: Self Supervised Task-Attention Network for Imitation Learning using Video Demonstration," 2020 IEEE International Conference on Robotics and Automation (ICRA) May 31-Aug. 31, 2020. Paris, France.

Rombach et al., "High-Resolution Image Synthesis with Latent Diffusion Models," IEEE Xplore (2022).

Sanh et al., "DistilBERT, a distilled version of BERT: smaller, faster, cheaper and lighter," arXiv:1910.01108v4 [cs.CL] Mar. 1, 2020.

Schulman et al., "Proximal Policy Optimization Algorithms," arXiv:1707.06347v2 [cs.LG] Aug. 28, 2017.

Sharma et al., "Third-Person Visual Imitation Learning via Decoupled Hierarchical Controller," 33rd Conference on Neural Information Processing Systems (NeurIPS 2019), Vancouver, Canada.

Sieb et al., "Graph-Structured Visual Imitation," 3rd Conference on Robot Learning (CoRL 2019), Osaka, Japan.

Smith et al., "AVID: Learning Multi-Stage Tasks via Pixel-Level Translation of Human Videos," arXiv:1912.04443v3 [cs.RO] Jun. 21, 2020.

Stadie et al., "Third-Person Imitation Learning," arXiv:1703. 01703v2 [cs.LG] Sep. 22, 2019.

Touvron et al., "Llama 2: Open Foundation and Fine-Tuned Chat Models," arXiv:2307.09288v2 [cs.CL] Jul. 19, 2023.

Vaswani et al., "Attention Is All You Need," 31st Conference on Neural Information Processing Systems (NIPS 2017), Long Beach, CA, USA.

Wang et al., "Structbert: Incorporating Language Structures Into Pre-Training for Deep Language Understanding,," arXiv:1908. 04577v3 [cs.CL] Sep. 27, 2019.

Yao et al., "Filip: Fine-Grained Interactive Language-Image Pre-Training," arXiv:2111.07783v1 [cs.CV] Nov. 9, 2021.

Yin et al., "A Survey on Multimodal Large Language Models," arXiv:2306.13549v2 [cs.CV] Apr. 1, 2024.

Sun et al., "Learning by Watching via Keypoint Extraction and Imitation Learning," Machines 2022, 10, 1049. https://doi.org/10. 3390/machines10111049.

Zhang et al., "An Object Attribute Guided Framework for Robot Learning Manipulations from Human Demonstration Videos," 2019 IEEE/RSJ International Conference on Intelligent Robots and Systems (IROS) Macau, China, Nov. 4-8, 2019.

Zhang et al., "MM-LLMs: Recent Advances in MultiModal Large Language Models," arXiv:2401.13601v5 [cs.CL] May 28, 2024.

Zhang et al., "LLAMA-Adapter: Efficient Fine-Tuning of Large Language Models With Zero-Initialized Attention," arXiv:2303. 16199v3 [cs.CV] Sep. 18, 2024.

Available online at https://youtu.be/YsdnsNjvwKo?si=bu2dXk8mQaL86C2M, at least as early as Aug. 23, 2023.

Available online at https://www.youtube.com/watch?v=q8ldbodRG14, at least as early as May 22, 2019.

Available online at https://youtu.be/GtPs_ygfaEA?si=7lv6MEFvFoaacKfa, at least as early as Aug. 15, 2023.

Available online at https://www.youtube.com/watch?v=G6JE7mNYz2A, at least as early as Oct. 17, 2024.

Available online at https://www.youtube.com/watch?v=FuNFr7V7KFQ, at least as early as Aug. 19, 2024.

Available online at https://www.youtube.com/watch?v=GzX1qOIO1bE, at least as early as May 13, 2024.

Available online at https://youtu.be/_MBd_XfXy9M?si=PbEHUJpRUFqaxS3J, at least as early as Jun. 26, 2023.

Available online at https://youtu.be/SHPxcRBIXN0?si=VbJqbK7jzUqtZGmn, at least as early as Sep. 26, 2023.

Available online at https://youtu.be/BvFxD-8AhJA?si=Vx1F4a76tbQDUX48, at least as early as Nov. 16, 2023.

Available online at https://www.youtube.com/watch?v=jWTWWuzB6Cg, at least as early as Aug. 27, 2024.

Available online at https://www.youtube.com/watch?v=B-ebMigAHzQ, at least as early as Sep. 30, 2024.

Available online at https://youtu.be/XiQkeWOFwmk?si=1qOPC8gXgmmGvXRT, at least as early as May 16, 2023.

(56)　　　　　　References Cited

OTHER PUBLICATIONS

Available online at https://youtu.be/cpraXaw7dyc?si=JvPaT6eMA18psrmU, at least as early as Dec. 13, 2023.
Available online at https://www.youtube.com/watch?v=DrNcXgoFv20, at least as early as Oct. 18, 2024.
Available online at https://youtu.be/BNSZ8Fwcd20?si=_YnVgjYblVuhASk1, at least as early as Oct. 27, 2023.
Available online at https://youtu.be/SS3Ga2HQQ0s?si=Dwr3sJuCsOeUoSLj, at least as early as Nov. 20, 2023.
Available online at https://www.youtube.com/watch?v=iWC8rSjDywU, at least as early as Oct. 18, 2024.
Available online at https://youtu.be/sih1DeJ4Hmk?si=fJsKpvRFPzFejmS6, at least as early as Dec. 27, 2023.
Available online at https://www.youtube.com/watch?v=zkBnFPBV3f0, at least as early as Jul. 11, 2013.
Available online at https://www.youtube.com/watch?v=oXBYZxa25vc&t=1s, at least as early as Apr. 3, 2013.
Available online at https://www.youtube.com/watch?v=LBeml9AmTT4, at least as early as Apr. 7, 2015.
Available online at https://www.youtube.com/watch?v=IE-YBaYjbqY, at least as early as Dec. 10, 2013.
Available online at https://www.youtube.com/watch?v=y-j4dixQQml&t=222s, at least as early as May 22, 2012.
Available online at https://www.youtube.com/watch?v=Bmglbk_Op64&t=1s, at least as early as Nov. 10, 2011.
Available online at https://www.youtube.com/watch?v=20GHG-R9eFl, at least as early as Mar. 6, 2023.
Available online at https://www.youtube.com/watch?v=bUrLuUxv9gE, at least as early as Aug. 30, 2024.
Available online at https://www.youtube.com/watch?v=-9EM5_VFlt8, at least as early as Apr. 16, 2024.
Available online at https://www.youtube.com/watch?v=29ECwExc-_M&t=2s, at least as early as Apr. 17, 2024.
Available online at https://www.youtube.com/watch?v=67CUudkjEG4, at least as early as Oct. 26, 2009.
Available online at https://www.youtube.com/watch?v=yBmatGQ0giY&t=1s, at least as early as Aug. 11, 2022.
Available online at https://www.youtube.com/watch?v=bdVrWxjK2vo, at least as early as Sep. 17, 2024.
Available online at https://www.youtube.com/watch?v=qw2y0kceAv0, at least as early as Oct. 15, 2024.
Available online at https://www.youtube.com/watch?v=B_I2k7MZEKg, at least as early as Jun. 30, 2024.
Available online at https://www.youtube.com/watch?v=CbA9wA9etGA, at least as early as Sep. 19, 2024.
Available online at https://www.youtube.com/watch?v=zLhA-RWBBYU, at least as early as Jul. 5, 2024.
Available online at https://www.youtube.com/watch?v=_mQJw8VhZ7w&t=111s, as least as early as Oct. 5, 2022.
Available online at https://www.youtube.com/watch?v=UPOLcE1vwA0, at least as early as Apr. 28, 2016.
Available online at https://www.youtube.com/watch?v=UBbk18oZbTc, at least as early as Oct. 14, 2024.
Available online at https://www.youtube.com/watch?v=UHe1zSQwep0, at least as early as Oct. 14, 2024.
Available online at https://www.youtube.com/watch?v=MCbGeC-kuBM, at least as early as Aug. 5, 2024.
Available online at https://www.youtube.com/watch?v=ujdK3yd2gHY, at least as early as Jul. 2, 2024.
Available online at https://www.youtube.com/watch?v=-HizP4UQvug, at least as early as Apr. 25, 2024.
Available online at https://www.youtube.com/watch?v=ioOkbUQqmZ0, at least as early as Nov. 9, 2022.
Available online at https://www.youtube.com/watch?v=zmqWU2dQKZ8, at least as early as Oct. 24, 2024.
Available online at https://www.youtube.com/watch?v=q8ldbodRG14, at least as early as Feb. 26, 2024.
Available online at https://www.youtube.com/watch?v=CUhuhleQNos, at least as early as May 22, 2019.

Available online at https://www.youtube.com/watch?v=dY57qnD_O7U, at least as early as Jul. 27, 2021.
Pateromichelakis et al., Head-eyes system and gaze analysis of the humanoid robot Romeo, 2014, IEEE, p. 1374-1379 (Year: 2014).
Jeung et al., Realization of human neck motion with novel robotic mechanism, 2016, IEEE, p. 482-486 (Year: 2016).
Park et al., Mechanical Design of Humanoid Robot Platform KHR-3 (Kaist Humanoid Robot 3: HUBO), 2005, IEEE, p. 321-3226 (2005).
International Search Report for PCT/US2025/016930 dated Jun. 10, 2025.
Nakada et al., Deep Learning of Neuromuscular and Visuomotor Control of a Biomimetic Simulated Humanoid, 2020, IEEE, p. 3952-3959 (Year: 2020).
Lim et al., Basic emotional walking using a biped humanoid robot, 1999, IEEE, p. 954-959 (Year: 1999).
Albers et al., Upper Body of a new Humanoid Robot—the Design of Armar III, 2006, IEEE, p. 308-309 (Year: 2006).
Mikayla Tetteh-Martey, (date posted Nov. 3, 2024), Blurring Lines: Resurgence of 'I, Robot', Cornellsun.com, URL: (https://www.cornellsun.com/article/2024/11/blurring-lines-resurgence-of-i-robot), (Year: 2024).
Mike Oitzman, (date posted Aug. 6, 2024), Figure 02 humanoid robot is ready to get to work, therobotreport.com, URL: (https://www.therobotreport.com/figure-02-humanoid-robot-is-ready-to-get-to-work/), (Year: 2024).
International Search Report for PCT/US2025/023064.
Englsberger et al., "Overview of the Torque-Controlled Humanoid Robot TORO," 2014 14th IEEE-RAS International Conference on Humanoid Robots (Humanoids), Nov. 18-20, 2014. Madrid, Spain.
Hebi Robotics, "T-Series Actuator," Jan. 29, 2024.
International Search Report for PCT/US2025/019793.
International Search Report for PCT/US2025/025005.
International Search Report for PCT/US2025/024817.
Cheng et al., "Human Posture Estimation Using Voxel Data for "Smart" Airbag Systems: Issues and Framework," IEEE, p. 84-89 (2004).
Droeschel et al., "Learning to Interpret Pointing Gestures with a Time-of-Flight Camera," IEEE, p. 481-488 (2025).
Frohlich et al., "Design and Impementation of a Spherical Joint for Mobile Manipulators," IEEE, p. 251-258 (2025).
Netzev et al., "Many Faced Robot—Design and Manufacturing of a parametric, Modular and Open Source Robot Head," IEEE, p. 342-348 (2019).
Netzev et al., Design and implementation of a spherical joint for mobile manipulators, 2019, IEEE, p. 342-348 (Year: 2019).
Haddadin et al., The "DLR crash report": Towards a standard crash-testing protocol for robot safety—Part II: Discussions, 2009, IEEE, p. 280-287 (Year: 2009).
Yaghoubi et al., Region-Based CNNs for Pedestrian Gender Recognition in Visual Surveillance Environments, 2019, IEEE, p. 1-5 (Year: 2019).
Pateromichelakis et al., Head-eyes system and gaze analysis of the humanoid robot Romeo, 2014, IEEE, p. 1374-131379 (Year: 2014).
Mokhtari et al., Taban:A Retro-Projected Social Robotic-Head for Human-Robot Interaction, 2019, IEEE, p. 46-51 (Year: 2019).
International Search Report for PCT/US25/23325.
Kim, Moo Jin, et al. "Openvla: An open-source vision-language-action model." arXiv preprint arXiv:2406.09246 (Jun. 13, 2024).
Bjorck, Johan, et al. "Gr00t n1: An open foundation model for generalist humanoid robots." arXiv preprint arXiv:2503.14734 (Mar. 18, 2025).
Advancing Physical AI with Nvidia Cosmos World Foundation Model Platform, avaiable at https://developer.nvidia.com/blog/advancing-physical-ai-with-nvidia-cosmos-world-foundation-model-platform/ (Jan. 9, 2025).
Building a Synthetic Motion Generation Pipeline for Humanoid Robot Learning, avaiable at https://developer.nvidia.com/blog/building-a-synthetic-motion-generation-pipeline-for-humanoid-robot-learning/ (Mar. 18, 2025).
Brohan, Anthony, et al. "Rt-1: Robotics transformer for real-world control at scale." arXiv preprint arXiv:2212.06817 (Dec. 13, 2022).

(56) References Cited

OTHER PUBLICATIONS

Zitkovich, Brianna, et al. "Rt-2: Vision-language-action models transfer web knowledge to robotic control." Conference on Robot Learning. PMLR, (Jul. 28, 2023).

Lynch, Corey, et al. "Interactive language: Talking to robots in real time." IEEE Robotics and Automation Letters (Oct. 12, 2023).

Team, Octo Model, et al. "Octo: An open-source generalist robot policy." arXiv preprint arXiv:2405.12213 (May 20, 2024).

Lynch, Corey, Kamelia Aryafar, and Josh Attenberg. "Images don't lie: Transferring deep visual semantic features to large-scale multimodal learning to rank." Proceedings of the 22nd ACM SIGKDD international conference on knowledge discovery and data mining. (Nov. 20, 2015).

Sermanet, Pierre, et al. "Time-contrastive networks: Self-supervised learning from video." 2018 IEEE international conference on robotics and automation (ICRA). IEEE, (Mar. 20, 2018).

Dwibedi, Debidatta, et al. "Learning actionable representations from visual observations." 2018 IEEE/RSJ international conference on intelligent robots and systems (IROS). IEEE, Feb. 2, 2018).

Lynch, Corey, et al. "Learning latent plans from play." Conference on robot learning. Pmlr, (Dec. 20, 2020).

Pirk, Sören, et al. "Online object representations with contrastive learning." arXiv preprint arXiv:1906.04312 (Jun. 10, 2019).

Gupta, Abhishek, et al. "Relay policy learning: Solving long-horizon tasks via imitation and reinforcement learning." arXiv preprint arXiv:1910.11956 (Oct. 25, 2019).

Lynch, Corey, and Pierre Sermanet. "Language conditioned imitation learning over unstructured data." arXiv preprint arXiv:2005.07648 (Jul. 7, 2020).

Jang, Eric, et al. "Bc-z: Zero-shot task generalization with robotic imitation learning." Conference on Robot Learning. PMLR, (Feb. 4, 2022).

Gupta, Abhishek, et al. "Bootstrapped autonomous practicing via multi-task reinforcement learning." arXiv preprint arXiv:2203.15755 (Mar. 29, 2022).

Heravi, Negin, et al. "Visuomotor control in multi-object scenes using object-aware representations." arXiv preprint arXiv:2205.06333 (May 12, 2022).

Ding, Tianli, et al. "Goalseye: Learning high speed precision table tennis on a physical robot." arXiv preprint arXiv:2210.03662 (Oct. 13, 2022).

Driess, Danny, et al. "Palm-e: An embodied multimodal language model." (Mar. 6, 2023).

Wiedebach, Georg, et al. "Walking on partial footholds including line contacts with the humanoid robot atlas." 2016 IEEE-RAS 16th International Conference on Humanoid Robots (Humanoids). IEEE, 2016.

Griffin, Robert J., et al. "Walking stabilization using step timing and location adjustment on the humanoid robot, atlas." 2017 IEEE/RSJ International Conference on Intelligent Robots and Systems (IROS). IEEE, 2017.

Griffin, Robert J., et al. "Straight-leg walking through underconstrained whole-body control." 2018 IEEE International Conference on Robotics and Automation (ICRA). IEEE, 2018.

Griffin, Robert J., et al. "Capture point trajectories for reduced knee bend using step time optimization." 2017 IEEE-RAS 17th International Conference on Humanoid Robotics (Humanoids). IEEE, 2017.

Griffin, Robert J., et al. "Footstep planning for autonomous walking over rough terrain." 2019 IEEE-RAS 19th international conference on humanoid robots (humanoids). IEEE, 2019.

Garcia, Gabriel, Robert Griffin, and Jerry Pratt. "0-step capturability, motion decomposition and global feedback control of the 3D variable height-inverted pendulum." arXiv preprint arXiv:1912.06078 (2019).

Dafarra, Stefano, et al. "Non-linear trajectory optimization for large step-ups: Application to the humanoid robot atlas." 2020 IEEE/RSJ International Conference on Intelligent Robots and Systems (IROS). IEEE, 2020.

Calvert, Duncan, et al. "A fast, autonomous, bipedal walking behavior over rapid regions." 2022 IEEE-RAS 21st International Conference on Humanoid Robots (Humanoids). IEEE, 2022.

Merged original document with English translation (CN 112959343); Paragraphs added for citation purposes. (Year: 2021).

Merged original document (KR 20180107353) with English Translation (Year: 2018).

Available online at https://x.com/elonmusk/status/1752516361799258318, at least as early as Jan. 30, 2024.

Duran-Hernandez et al., "Control Implementation in a Low-cost Designed Biped Robot to Reproduce Squats," The 10th International Conference on Control, Mechatronics and Automation, Nov. 9, 2022.

Hao et al., Design and kinematics analysis of a 4-DOF articulated steering mechanism, 2015, IEEE, p. 5875-5880 (Year: 2015).

Or, Computer Simulations of a Humanoid Robot Capable of Walking Like Fashion Models, 2012, IEEE, p. 241-248 (Year: 2012).

Available online at https://www.youtube.com/watch?v=Fb_R6IDDU4A, at least as early as Oct. 9, 2020.

Available online at https://www.youtube.com/watch?v=_mQJw8VhZ7w, at least as early as Oct. 5, 2022.

Available online at https://www.youtube.com/watch?v=a-R4H8-8074, at least as early as Jun. 6, 2015.

Available online at https://www.youtube.com/watch?v=1fC7b2LjVW4, at least as early as Jul. 12, 2016.

Ophaswongse et al., Optimal Design of a Novel 3-DOF Orientational Parallel Mechanism for Pelvic Assistance on a Wheelchair: An Approach Based on Kinematic Geometry and Screw Theory, 2020, IEEE, p. 3315-3322 (Year: 2020).

Shafti et al., Real-time Robot-assisted Ergonomics, 2019, IEEE, p. 1975-1981 (Year: 2019).

Luo et al., Human body trajectory generation using point cloud data for robotics massage applications, 2014, IEEE, p. 5612-5617 (Year: 2014).

Cheng et al., Human posture estimation using voxel data for "smart" airbag systems: issues and framework, 2004, IEEE, p. 84-89 (Year: 2004).

Or, Humanoids Grow a Spine: The Effect of Lateral Spinal Motion on the Mechanical Energy Efficiency, 2012, IEEE, p. 1-11 (Year: 2012).

Souissi et al., Influence of the number of humanoid vertebral column pitch joints in flexion movements, 2011, IEEE, p. 227-282 ( Year: 2011).

* cited by examiner

HUMANOID ROBOT

CROSS-REFERENCE TO RELATED APPLICATIONS

This application claims the benefit of and priority to U.S. Provisional Patent Application No. 63/557,874 filed on Feb. 26, 2024, the disclosure of which is expressly incorporated by reference herein in its entirety.

Reference is hereby made to: (i) U.S. patents application Ser. No. 18/919,263, Ser. No. 18/919,274, Ser. No. 19/006, 191, Ser. No. 19/000,626, Ser. No. 19/038,657, (ii) U.S. Provisional Patent Application Nos. 63/561,318, 63/556, 102, 63/626,039, 63/626,040, 63/696,533, 63/696,507, 63/706,768, 63/614,499, 63/617,762, 63/561,315, 63/573, 226, 63/615,766, 63/620,633, 63/626,028, 63/626,030, 63/626,034, 63/626,035, 63/626,037, 63/564,741, 63/707, 547, 63/708,003, 63/626,105, 63/625,362, 63/625,370, 63/625,381, 63/625,384, 63/625,389, 63/625,405, 63/625, 423, 63/625,431, 63/685,856, 63/700,749, 63/722,057, 63/635,152, 63/561,317, 63/573,543, 63/633,931, 63/634, 697, 63/632,630, 63/632,683, 63/633,941, and (iii) PCT Patent Application Nos. PCT/US25/12544, PCT/US25/ 11450, PCT/US25/10425, PCT/US25/16930, the disclosures of each of which is expressly incorporated by reference herein in its entirety.

TECHNICAL FIELD

The present disclosure relates to humanoid robots, and more particularly to the structure and capabilities of the humanoid robot to complete tasks such as moving objects, including heavier objects, from one location to another location that are separated by an appreciable distance.

BACKGROUND

The current workplace landscape is marked by an unparalleled labor shortage, evident in over 10 million unsafe or undesirable jobs within the United States. To counter this ever-expanding labor shortage, designing and integrating advanced robots capable of handling unappealing and even hazardous workplace tasks has become imperative. To perform these tasks in an optimal and efficient manner, advanced robots are typically general-purpose humanoid robots tailored for human-centric environments.

These general-purpose humanoid robots emulate human form and functionality with two legs, two arms, and a screen. With the general-purpose humanoid robot's emulation of the human body, arises the necessity for a torso and associated appendages that can closely replicate human movements, capabilities, and structural nuances. This need for the torso and associated appendages to be capable of mimicking human structure and functions extends far beyond cosmetic resemblance. For example, it is also desirable that the torso and associated appendages enable the end effector of the robot to be able to seamlessly interact with and physically manipulate diverse objects in complex environments, while performing in a durable, cost-effective, and controllable manner using the robot's limited resources, including its battery power resources.

Existing humanoid robot designs often struggle to achieve the desired balance between functionality, durability, and energy efficiency. Many current designs utilize complex systems of cables, pulleys, or hydraulics to actuate joints, which can be prone to wear, require frequent maintenance, and consume substantial amounts of power. Additionally, the integration of multiple degrees of freedom in a compact form factor while maintaining structural integrity and range of motion comparable to a human arm presents ongoing challenges. Furthermore, the control systems for humanoid robot arms frequently face difficulties in accurately replicating the nuanced movements of human limbs, particularly in tasks requiring fine motor skills or adaptability to varying environmental conditions. The development of intuitive and responsive control algorithms that can seamlessly translate human-like movements to robotic actuation remains an area of active research and development.

As the field of humanoid robotics continues to evolve, there is an ongoing need for innovative designs and technologies that can address these challenges while advancing the capabilities of general-purpose humanoid robots in diverse workplace environments.

SUMMARY

The presently disclosed subject matter is directed to a humanoid robot. Particularly, the humanoid robot comprises a torso, a left arm assembly coupled to the torso and having a first reference line, a left wrist coupled to the left arm assembly and including at least a rotational axis, and a left end effector coupled to the left wrist assembly and configured to move about the rotational axis. The left end effector includes: (i) a finger assembly with a second reference line and at least two degrees of freedom, and (ii) a thumb assembly with at least three degrees of freedom. A first angle is formed between the first and second reference lines when the left wrist is in a first configuration, and wherein said first angle is greater than 70 degrees. A second angle is formed between the first and second reference lines when the left wrist is in a second configuration and wherein said second angle is greater than 70 degrees. The difference between the first and second angles is more than 150 degrees.

The presently disclosed subject matter is directed to a humanoid robot. Particularly, the humanoid robot comprises a torso, a left arm assembly coupled to the torso, a left wrist coupled to the left arm assembly and includes: (i) a wrist pitch actuator with a first rotational axis and a range of motion that is more than 50 degrees and less than 160 degrees, and (ii) wrist yaw actuator with a second rotational axis and a range of motion that is more than 100 degrees and less than 250 degrees, and wherein the first and second rotational axes are perpendicular to one another. The humanoid robot also includes a left end effector coupled to the left wrist assembly and configured to move about the first and second rotational axes, and wherein the left end effector includes at least twelve degrees of freedom that are distributed between a plurality of finger assemblies and a thumb assembly.

The presently disclosed subject matter is directed to a humanoid robot. Particularly, the humanoid robot comprises a torso, a left arm assembly coupled to the torso, a left wrist coupled to the left arm assembly and having a three-dimensional position and a three-dimensional rotation in an action space, and a left end effector coupled to the left wrist assembly and including: (i) a plurality of finger assemblies, and (ii) a thumb assembly with at least three degrees of freedom. The humanoid robot includes: (i) a first artificial intelligence algorithm configured to: (a) receive voice commands from a human and sensor data, and (b) provide processed data, and (ii) a second artificial intelligence algorithm configured to: (a) receive processed data from the first artificial intelligence algorithm, and sensor data, and (b)

provide output data that is configured to control the three-dimensional position and a three-dimensional rotation of the left wrist assembly.

The presently disclosed subject matter is directed to a humanoid robot. Particularly, the humanoid robot comprises an upper portion including a torso and at least one arm assembly, a central portion including a spine and a pelvis, a lower portion including at least one leg assembly, and a plurality of actuators distributed among the upper, central, and lower portions to provide at least 30 degrees of freedom, wherein at least 60% of the degrees of freedom are positioned in the upper portion.

The presently disclosed subject matter is directed to a humanoid robot. Particularly, the humanoid robot comprises an upper portion including a torso, two arm assemblies, and two end effectors, a central portion including a spine and a pelvis, a lower portion including two leg assemblies, and a plurality of actuators distributed among the upper, central, and lower portions to provide at least 45 degrees of freedom, wherein at least 65% of the degrees of freedom are positioned in the upper portion.

The presently disclosed subject matter is directed to a humanoid robot. Particularly, the humanoid robot comprises an upper portion including a torso, two arm assemblies, two wrists, and two end effectors, a central portion including a spine and a pelvis, a lower portion including two leg assemblies, and a plurality of actuators distributed among the upper, central, and lower portions to provide at least 60 degrees of freedom, wherein at least 70% of the degrees of freedom are positioned in the upper portion.

The presently disclosed subject matter is directed to a humanoid robot. Particularly, the humanoid robot comprises an upper portion including a torso, two arm assemblies, two wrists, and two end effectors, a central portion including a spine and a pelvis, a lower portion including two leg assemblies, and a plurality of actuators distributed among the upper, central, and lower portions to provide 62 degrees of freedom, wherein 48 degrees of freedom are positioned in the upper portion.

The presently disclosed subject matter is directed to a humanoid robot. Particularly, the humanoid robot comprises an upper portion including a torso, two arm assemblies, two wrists, and two end effectors, a central portion including a spine and a pelvis, a lower portion including two leg assemblies, and a plurality of actuators distributed among the upper, central, and lower portions, wherein each end effector includes 16 degrees of freedom.

The presently disclosed subject matter is directed to a humanoid robot. Particularly, the humanoid robot comprises an upper portion including a torso, two arm assemblies, two wrists, and two end effectors, a central portion including a spine and a pelvis, a lower portion including two leg assemblies, and a plurality of actuators distributed among the upper, central, and lower portions, wherein each arm assembly includes 6 degrees of freedom.

The presently disclosed subject matter is directed to a humanoid robot. Particularly, the humanoid robot comprises an upper portion including a torso, two arm assemblies, two wrists, and two end effectors, a central portion including a spine and a pelvis, a lower portion including two leg assemblies, and a plurality of actuators distributed among the upper, central, and lower portions, wherein the central portion includes 10 degrees of freedom.

The presently disclosed subject matter is directed to a humanoid robot. Particularly, the humanoid robot comprises an upper portion including a torso, two arm assemblies, two wrists, and two end effectors, a central portion including a spine and a pelvis, a lower portion including two leg assemblies, and a plurality of actuators distributed among the upper, central, and lower portions, wherein the lower portion includes 4 degrees of freedom.

The presently disclosed subject matter is directed to a humanoid robot. Particularly, the humanoid robot comprises an upper portion including a torso, two arm assemblies, two wrists, and two end effectors, a central portion including a spine and a pelvis, a lower portion including two leg assemblies, and a plurality of actuators distributed among the upper, central, and lower portions, wherein at least 95% of the actuators are electric rotary actuators.

The presently disclosed subject matter is directed to a humanoid robot. Particularly, the humanoid robot comprises an upper portion including a torso, two arm assemblies, two wrists, and two end effectors, a central portion including a spine and a pelvis, a lower portion including two leg assemblies, and a plurality of actuators distributed among the upper, central, and lower portions, wherein over 60% of the actuators are configured to directly drive a next part of the robot without a linkage.

The presently disclosed subject matter is directed to a humanoid robot. Particularly, the humanoid robot comprises an upper portion including a torso, two arm assemblies, two wrists, and two end effectors, a central portion including a spine and a pelvis, a lower portion including two leg assemblies, and a plurality of actuators distributed among the upper, central, and lower portions, wherein each end effector includes a thumb assembly with a direct drive linkage system paired with a single biasing member.

The presently disclosed subject matter is directed to a humanoid robot. Particularly, the humanoid robot comprises an upper portion including a torso, two arm assemblies, two wrists, and two end effectors, a central portion including a spine and a pelvis, a lower portion including two leg assemblies, and a plurality of actuators distributed among the upper, central, and lower portions, wherein each end effector includes finger assemblies with components that can be linked or fixed so that movement in one part produces movement in another.

The presently disclosed subject matter is directed to a humanoid robot. Particularly, the humanoid robot comprises an upper portion including a torso, two arm assemblies, two wrists, and two end effectors, a central portion including a spine and a pelvis, a lower portion including two leg assemblies, and a plurality of actuators distributed among the upper, central, and lower portions, wherein each end effector includes four identical finger assemblies arranged in a single plane and offset in X-Y and X-Z planes.

In some embodiments, a humanoid robot comprises a left end effector with a plurality of finger assemblies, including a first assembly, and at least twelve degrees of freedom distributed between the finger assemblies and the thumb assembly. Each finger assembly includes at least three degrees of freedom and incorporates a direct drive linkage with a single biasing member, eliminating the need for multiple springs to maintain an open or neutral position. The left wrist includes a pitch actuator with a range of motion exceeding 50 degrees but less than 160 degrees, and a yaw actuator with a rotational axis allowing movement between 100 degrees and 250 degrees. The humanoid robot has at least 30 degrees of freedom, with at least 65% to 75% positioned in the upper portion, while the central portion contains 10 degrees of freedom and the lower portion contains 4 degrees of freedom. Additionally, each arm assembly incorporates 6 degrees of freedom, and each end effector possesses 16 degrees of freedom. The humanoid robot features at least 40 degrees of freedom, with a majority concentrated in its upper portion. The direct drive linkage system in the thumb assembly comprises nesting components supported by coupling points on both sides of a central plane. At least 60% of the actuators are configured for direct drive without the need for linkage mechanisms, and at least 95% of the actuators are electric rotary actuators.

In other embodiments, the housing of each end effector includes a coupling assembly for wrist mounting and a main enclosure that partially houses the thumb and finger assemblies. The left wrist's range of motion surpasses that of a typical human wrist. The humanoid robot is designed to manipulate a bin by curling its finger assembly around a lower edge of the handle, enabling transport between locations while maintaining an angle between 70 degrees and 120 degrees between two reference lines during movement. The humanoid robot integrates artificial intelligence, including a first algorithm operating at a frequency between 0.1 Hz and 50 Hz to generate processed data, and a second algorithm functioning between 10 Hz and 1,000 Hz to control the three-dimensional position and rotation of the left wrist assembly. The first algorithm contains more parameters than the second, with the second having 70% fewer parameters than the first. These AI models are trained using a temporal offset to counterbalance inference latency differences. The humanoid robot further includes a head with a screen configured to display non-verbal communication indicia and is capable of generating data for artificial intelligence model development. Furthermore, the robot incorporates less than 50 actuators, with the number of electric rotary actuators being fewer than the number of degrees of freedom.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
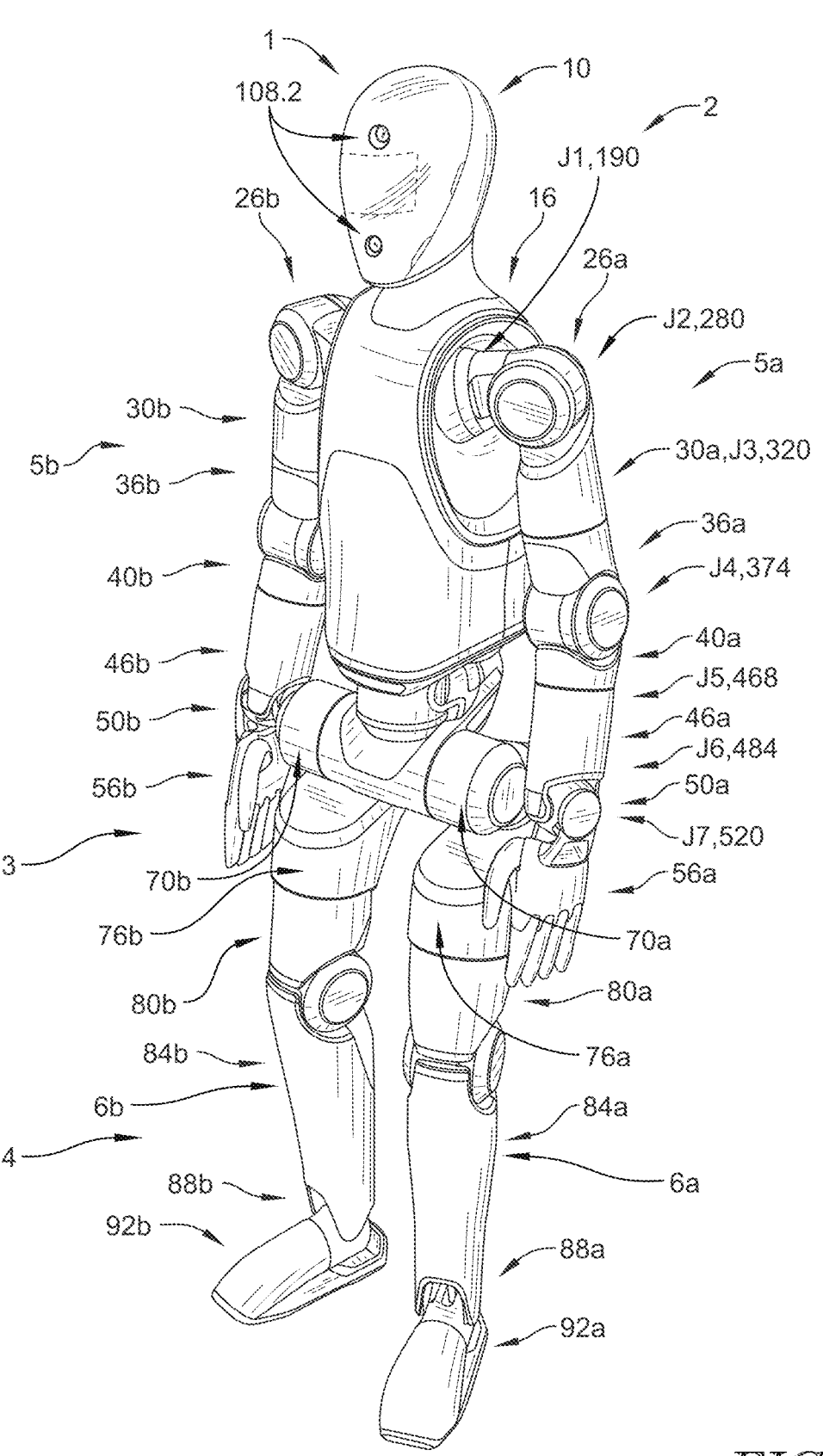
FIG. 1 is a perspective view of a humanoid robot in a neutral position, and wherein said robot is includes: (i) an upper portion having the following parts: (a) a head/neck, (b) a torso, (c) left and right shoulders, (d) left and right upper arm assemblies that each include an upper humerus, lower humerus, upper forearms, and lower forearms, (e) left and right wrists, and (f) left and right hands, (ii) a central portion having the following parts: (a) a spine, (b) a pelvis, (c) left and right hips, (d) left and right upper thighs, and (f) left and right lower thighs, and (iii) a lower portion having the following parts: (a) a left and right shins, (b) left and right talus, and (c) left and right feet.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present disclosure.

While this disclosure includes several embodiments in many different forms, the drawings contained herewith are considered exemplary. As such, said drawings are not intended to limit the broad aspects of the disclosed concepts. As will be realized, the disclosed methods and systems are capable of other and different configurations, and several details are capable of being modified without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts or the method of assembling the shoulder and upper arm may be performed in a different order. In summary, the drawings, flow charts and detailed descriptions are to be regarded as illustrative in nature, not restrictive or limiting.

1. Introduction

The current workplace landscape is characterized by an unprecedented labor shortage, particularly evident in over 10 million unsafe or undesirable jobs across the United States. To address this growing labor deficit, there is a need for advanced robots capable of performing unappealing and hazardous workplace tasks. However, conventional robots may have limitations in their ability to operate effectively in human-centric environments. This creates a need for: (i) advanced robots capable of handling undesirable and hazardous tasks, or (ii) advanced robots capable of generating data that can be utilized to develop cutting-edge artificial intelligence models (e.g., LLMs, VLMs, VLAs, BAMs and/or Helix) to enable these robots to operate autonomously in human-centric environments.

One such unappealing and hazardous workplace task may be or may involve the identification and movement of containers, such as bins, from one location to another location. For example, a bin full of components collected in one area of a manufacturing facility may need to be transported to another area of the manufacturing facility for use in a manufacturing operation. The collected components may be heavy, and the repeated movement of bins filled with those components from one location to another may be tiresome for a human who may also be prone to misidentify the container intended for a specific location/manufacturing operation. In another example, containers within a warehouse may need to be moved from one area (e.g., where items within the container are gathered for an outgoing order) to another area (e.g., for final packaging and shipping).

Providing an advanced robot that is either capable of handling undesirable and hazardous tasks and/or generating data from performing undesirable and hazardous tasks poses a challenge due to the vast array of potential positions and locations, and states said robot could occupy at any given time in a challenging environment. The multitude of these permutations can be minimized by training the robot system through various methods such as: (i) imitation learning or teleoperation, (ii) supervised learning, (iii) unsupervised learning, (iv) reinforcement learning, (v) inverse reinforcement learning, (vi) regression techniques, or (vii) other established methodologies. While training may help minimize the multitude of permutations, including undesirable components or undesirable configurations will likely reverse any benefit of training the robot and may make specific tasks impossible or nearly impossible. Accordingly, it is advantageous to include the desirable components and an arrangement of the same to maximize the utilization of training the robot and enable it to perform as many tasks as specified by the robot designer.

Desirable components and an arrangement of the same may include a wrist that is configured to pivot about a fixed point, enabling a broad range of motion that extends from a maximum inward position to a maximum outward position. At the maximum inward position, the wrist may articulate to form an inward angle of approximately 70 degrees relative to the central axis of the arm. Similarly, at the maximum outward position, the wrist may achieve a 70-degree inward angle with respect to the same central axis. This articulation results in a total range of motion of approximately 220 degrees, with a preferred minimum range of at least 180 degrees. This extensive range of motion surpasses the typical articulation limits observed in human wrists. In human biomechanics, wrist articulation is naturally constrained, requiring compensatory movements such as repositioning the arm or adjusting the body's posture when lifting or transporting objects, particularly when handling loaded containers or performing intricate manipulations. Unlike human counterparts, a robotic system equipped with an enhanced wrist articulation range can execute these tasks more efficiently without necessitating additional limb repositioning.

By reducing the need for compensatory arm or body adjustments, the robotic system optimizes energy efficiency and minimizes unnecessary motion complexity. This design choice enhances operational robustness, particularly in repetitive or precision-based tasks, by ensuring smoother, more direct movement paths. The expanded range of motion also improves task execution flexibility, allowing for more effective object manipulation, grasping, and placement in constrained or cluttered environments. Additionally, integrating advanced motor control and feedback systems within the wrist assembly may further refine movement accuracy, adaptability, and responsiveness to dynamic conditions. Thus, by extending the articulation range beyond that of a human wrist, the robotic system not only simplifies task execution but also increases operational efficiency, reduces mechanical strain, and enhances adaptability across various industrial and logistical applications.

Desirable components and an arrangement of the same may also include at least 30 degrees, preferably at least 45 degrees, and most preferably at least 60 degrees, and in some embodiments 62 degrees of freedom (DoF). In particular, the 62 degrees of freedom are distributed within the robot 1 as follows: (i) 48 degrees of freedom are contained in the upper portion 2 of the robot 1, (ii) 10 degrees of freedom are contained in the central portion 3 of the robot 1, and (iii) 4 degrees of freedom are contained in the lower portion 4 of the robot 1. Stated another way, the 62 degrees of freedom are distributed within the robot 1 as follows: (i) 16 degrees of freedom are contained in each end effector 56, (ii) 6 degrees of freedom are contained in each arm assembly 5, and (iv) 2 degrees of freedom are contained in each of the upper torso, spine/pelvis, and neck 10, 16, 60, 64. The number and distribution of the degrees of freedom provide the robot 1 several significant advantages over conventional robots. For example, positioning over 60%, preferably over 65%, most preferably over 72%, and about 77% of the degrees of freedom in the upper portion 2 of said robot 1 allows it to perform complex, dexterous tasks that could not be performed without a substantial majority of the degrees of freedom being positioned in said upper portion. As another example, minimizing the number of degrees of freedom in the central portion 3 allows the robot 1 to have a larger torso 16, which allows for the inclusion of a larger battery pack and additional computing power; thereby improving the performance and reliability of the robot 1. As a further example, including at least 5% of the degrees of freedom within the lower portion 4 of the robot 1 allows it to minimize the time and number of steps required for turning around, which allows the robot 1 to have more humanlike movements and increases the speed at which certain tasks can be accomplished.

The above described 62 degrees of freedom of the robot 1 are provided by a combination of less than 60 actuator, preferably less than 50, and most preferably less than 45 actuators, and about 42 electric rotary and linear actuators (J1-J16), wherein an overwhelming majority (e.g., over 95%) of the actuators are electric rotary actuators as compared to linear actuators. In other words, the robot 1 only includes 2 linear actuators out of the 42 actuators contained in said robot 1. Of the 42 electric actuators, a majority (e.g., over 60%) are not configured to drive a linkage; instead, said actuators are designed to directly drive the next part(s) of the robot 1. In particular, linkages are coupled to: (i) 14 rotary actuators of said 40 rotary actuators, and (ii) all of the linear actuators. In other words, 35% of the rotary actuators and 100% of the linear actuators are coupled to a linkage. These linkages allow: (i) the fingers and thumb to be underactuated, or in other words, the fingers and thumb retain their ability to flex, curl, or rotate around an object while eliminating the need for an actuator to control each joint or degree of freedom, (ii) the wrist to have two degrees of freedom that not only interact with one another, but are also substantially perpendicular to one another, and (iii) the foot to pivot around an axis that is located well forward (e.g., more than 10% of the overall length of the foot) of the center of the drive linkage.

In addition to optimized kinematic configurations, the robot may have high-precision actuators paired with real-time sensor feedback loops and a control system. The sensors may be designed to continuously monitor the robot's orientation, speed, and force exerted on one or more robot components (e.g. arm assembly, leg assembly, etc.). The control system may comprise a computing device including a processor and memory, and instructions, when executed in the computing device, to receive data from a plurality of sensors and control the actuators to affect movement of one or more of the robot components. The computing device of the robot may reside in a networked environment and execute additional instructions and/or applications not disclosed herein. The data collected can be processed by an advanced computing architecture, residing in the networked environment, to further train the neural networks that enable the robot to perform its tasks (e.g., enabling it to walk more human-like, climb stairs, or traverse uneven terrain with fluidity and stability) or said data may be used to train other neural networks that are designed to control different robots. Additionally, the disclosed advanced robots may also address technical challenges related to dexterity and object manipulation. For example, the disclosed robots may include end effectors that feature multi-jointed designs with a high number of degrees of freedom, enabling complex and precise movements. Additionally, tactile sensors may be embedded in the said end effectors to provide detailed feedback on pressure, texture, and temperature, which again can be used to train local or remote neural networks to improve execution of the set of tasks and/or response to other sensor input.

The robot may further include a cutting-edge computer vision system, which may be equipped with depth perception and object recognition capabilities. By integrating sensory data with artificial intelligence algorithms, the robot may learn from experience, improving its ability to grasp and manipulate a wide variety of objects over time. Predictive algorithms may also enable the robot to anticipate the behavior of dynamic objects, such as catching a ball in mid-air or interacting with moving conveyor belts in industrial settings. Also, the robot may be capable of enhanced by the incorporation of human-robot interaction (HRI) capabilities with the robot. Equipped with auditory sensors and advanced natural language processing (NLP) algorithms, the robot may engage in verbal communication, understanding and generating speech in multiple languages. It may process contextual information to generate appropriate responses and detect emotional nuances in human speech, enabling meaningful and context-aware interactions. Additionally, the robot may integrate non-verbal communication cues, such as gestures and block-based expressions (e.g., non-verbal communication indicia) displayed on its screen, to create intuitive and human-like interactions. These features may make the robot highly adaptable to social environments, including classrooms, eldercare facilities, and hospitality settings.

Finally, the robot may include redundant systems to help ensure continuous operation in the event of component failure. For example, critical systems such as balance control and power management may be supported by backup circuits and secondary control algorithms. Advanced diagnostic tools may continuously monitor the robot's components, predicting potential failures before they occur and initiating self-repair routines or alerting users. These safety measures, combined with the robot's robust energy management systems, may ensure reliable performance in diverse and demanding applications.

2. Robot Configuration

Figure 2:
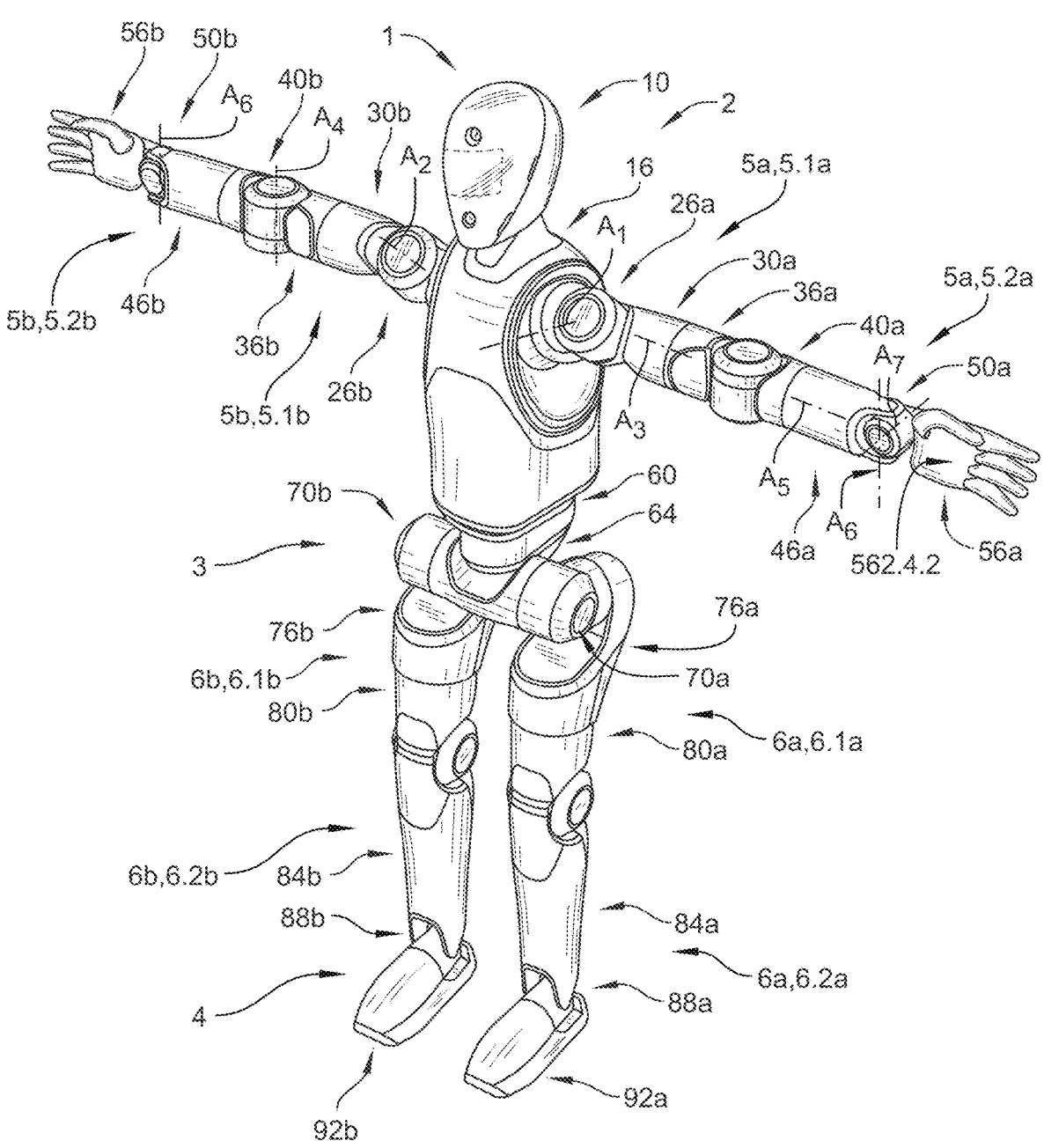
FIG. 2 is a perspective view of the robot of FIG. 1 in an extended position, wherein said robot's arms, wrists, and end effectors are extended outward from the torso.
Figure 3A:
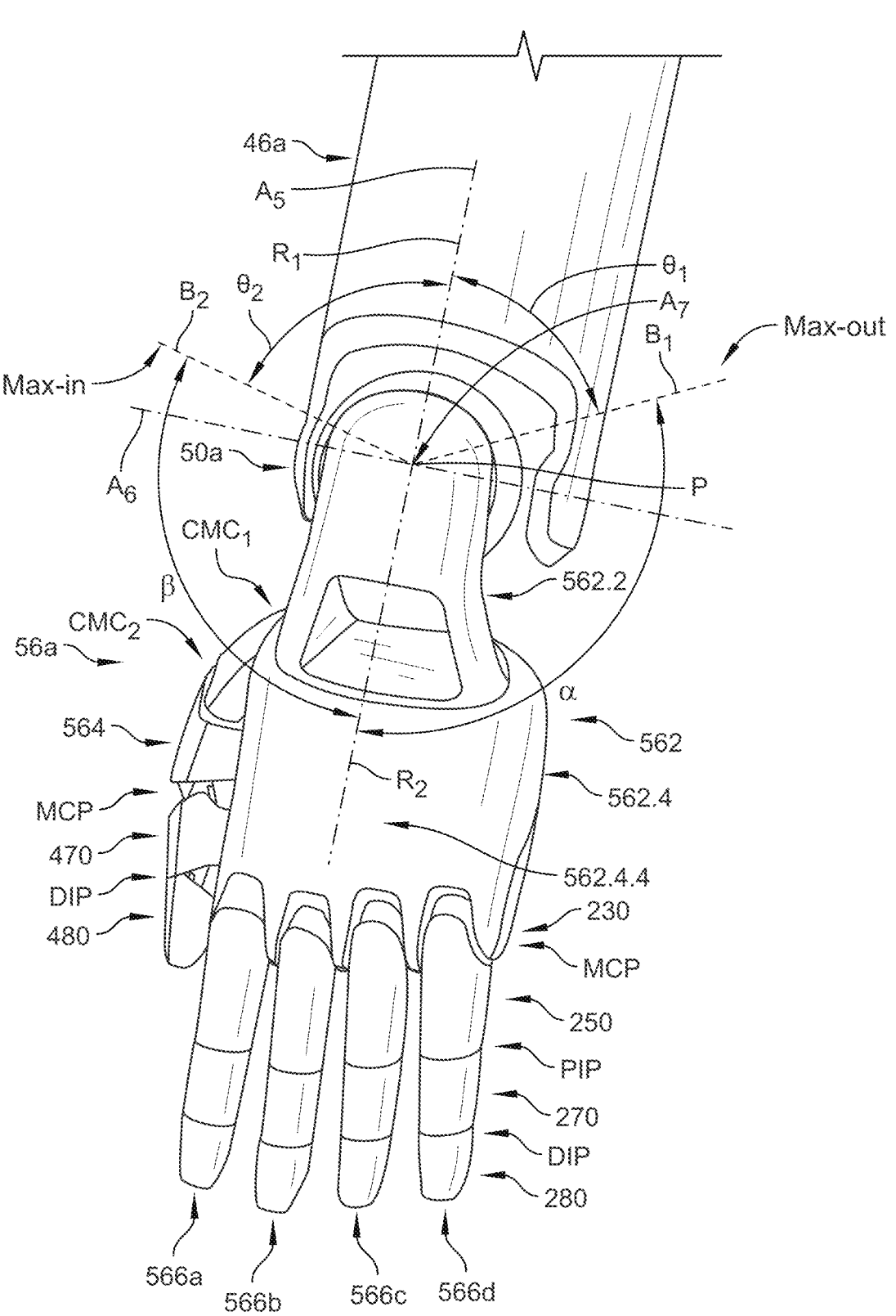
FIG. 3 is a perspective view of a left wrist and end effector of the robot of FIG. 1 showing the exemplary configuration thereof and illustrative range of motion of the end effector compared to the upper arm assembly.
Figure 3B:
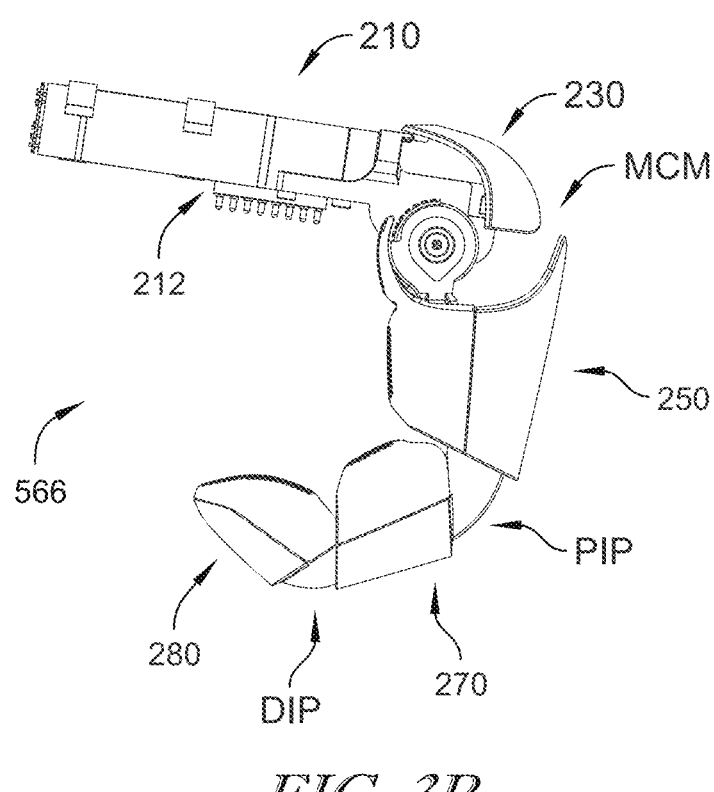
Figure 3C:
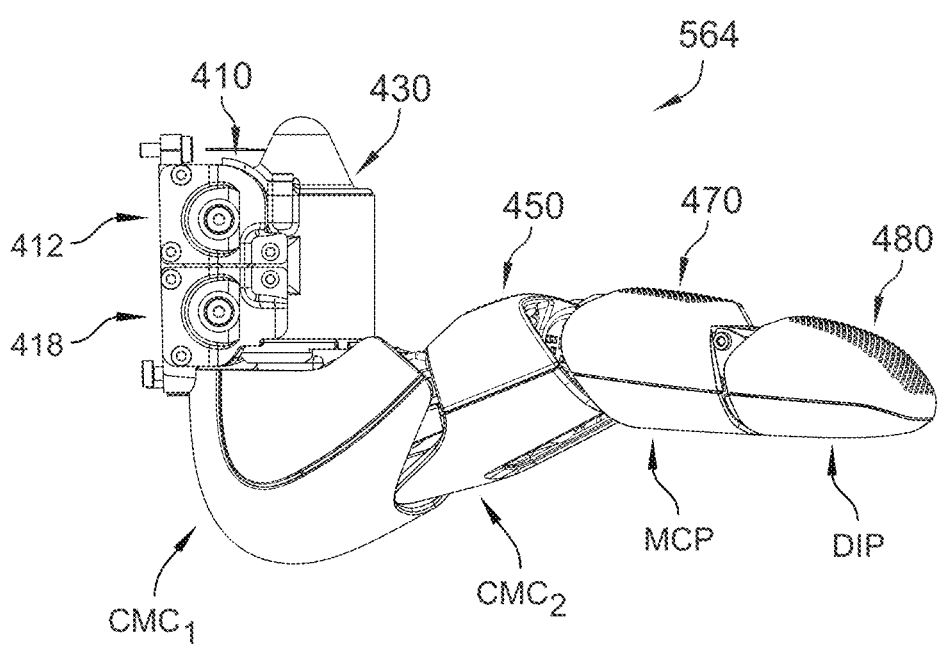

FIGS. 1-11 disclose various embodiments of desirable components and an arrangement of the same in versatile and highly-functional humanoid robots 1. FIGS. 2 and 3 show a humanoid robot 1 including a head/neck 10, torso 16, left and right arms, and left and right legs. In particular the illustrative robot 1 includes (i) an upper portion 2 having the following parts: (a) a head/neck 10, (b) a torso 16, (c) left and right shoulders 26a, 26b, (d) left and right upper arm assemblies 20a, 20b that each include an upper humerus 30a, 30b, lower humerus 36a, 36b, upper forearms 40a, 40b, and lower forearms 46a, 46b, (e) left and right wrists 50a, 50b, and (f) left and right end effectors 56a, 56b, (ii) a central portion 3 having the following parts: (a) a spine 60, (b) a pelvis 64, and (c) left and right hips 70a, 70b, and (iii) a lower portion 4 having the following parts: (a) left and right upper leg assemblies 24a, 24b that each include left and right upper thighs 76a, 76b, left and right lower thighs 80a, 80b, and left and right shins 84a, 84b, (b) left and right talus 88a, 88b, and (c) left and right feet 92a, 92b. In the illustrative embodiment, one or more actuators, linkages, and associated electronics and wiring are arranged at the junctions between each of the identified components to allow relative rotation therebetween for movement and operation of the humanoid robot 1 in accordance with the present disclosure.

Shown in at least FIGS. 1-2, the actuators contained within the physical upper portion of the robot 1 include actuators (J1-J7) housed within components of the robot 1 to actuate movement of the components of said robot 1. Below is a summary table showing the actuators reference names and numbers, actuator names, and associated components from high level configuration of the robot 1.

TABLE 1

| Actuator | Actuator Name | Actuator Axis or Rotational Axis |
|---|---|---|
| J1 (190) | Arm Actuator | Arm Axis, $A_1$ |
| J2 (280) | Shoulder Actuator | Shoulder Axis, $A_2$ |
| J3 (320) | Upper Arm Twist, Upper Arm X, or Upper Arm Roll Actuator | Upper Arm Twist, Upper Arm X, or Upper Arm Roll Axis, $A_3$ |
| J4 (374) | Elbow, Arm Z, Arm Yaw, or Lower Humerus Actuator | Elbow, Arm Z, Arm Yaw, or Lower Humerus Axis, $A_4$ |
| J5 (468) | Lower Arm Twist, Lower Arm X, or Lower Arm Roll Actuator | Lower Arm Twist, Lower Arm X, or Lower Arm Roll Axis, $A_5$ |
| J6 (484) | Wrist Flex, Wrist/Hand Y, Wrist/Hand Pitch, or Flick Actuator | Wrist Flex, Wrist/Hand Y, Wrist/Hand Pitch, or Flick Axis, $A_6$ |
| J7 (520) | Wrist Pivot, Wrist/Hand Z, Wrist/Hand Yaw, or Wave Actuator | Wrist Pivot, Wrist/Hand Z, Wrist/Hand Yaw, or Wave Axis, $A_7$ |

The following table of the maximum and minimum angles of each actuator and their associated range of motion can be generated. It should be understood that the below angles and ranges of motion are exemplary and are provided to show the robot's 1 ability to not only have a significant number of degrees of freedom (i.e., 62), but each degree of freedom is associated with a significant range of motion. This is in contrast to conventional robots that lack these large ranges of motion, which prevents said conventional robots from completing the complex humanlike tasks that the disclosed robot 1 can perform. However, said ranges of motion are not unnecessarily large to generate additional training and performance issues.

19/000,626, 63/614,499, 63/617,762, 63/561,315, 63/573, 226, 63/615,766, and 63/620,633.

The design of the end effectors minimizes manufacturing steps, complexity, and cost while enhancing modularity by allowing certain components of the end effector to be either linked or fixed together. In this configuration, moving one component causes a corresponding movement in another.

TABLE 2

| Actuator | First Angle | Second Angle | Range of Motion | Preferred First Angle | Preferred Second Angle | Preferred Range of Motion |
|---|---|---|---|---|---|---|
| JI | −162 | 108 | 270 | −148 | 99 | 247 |
| J2 | −129 | 48 | 177 | −118 | 44 | 162 |
| J3 | −144 | 144 | 288 | −132 | 132 | 264 |
| J4 | −162 | 18 | 180 | −148.5 | 16.5 | 165 |
| J5 | −182 | 182 | 364 | −176 | 176 | 352 |
| J6 | −54 | 54 | 108 | −49.5 | 49.5 | 99 |
| J7 | −110 | 110 | 220 | −99 | 99 | 198 |

It is understood that number/location of actuators, range of motion, and/or arrangement of axis of rotation associated with the disclosed humanoid robot materially and substantially differ from the number/location of actuators, range of motion, and/or arrangement of axis of rotation for a non-humanoid robot. As such, the structures, number/location of actuators, range of motion, and/or arrangement of axis of rotation associated with non-humanoid robot cannot be simply adopted or implemented into a humanoid robot without careful analysis and verification of the complex realities of designing, testing, and manufacturing a general purpose humanoid robot. Theoretical designs that are an attempt to implement such modifications from a non-humanoid robot are insufficient (and in some instances, woefully insufficient) because they amount to mere design exercises that are not tethered to the complex realities of successfully of designing, testing, and manufacturing a general purpose humanoid robot.

a. End Effector

Figure 4:
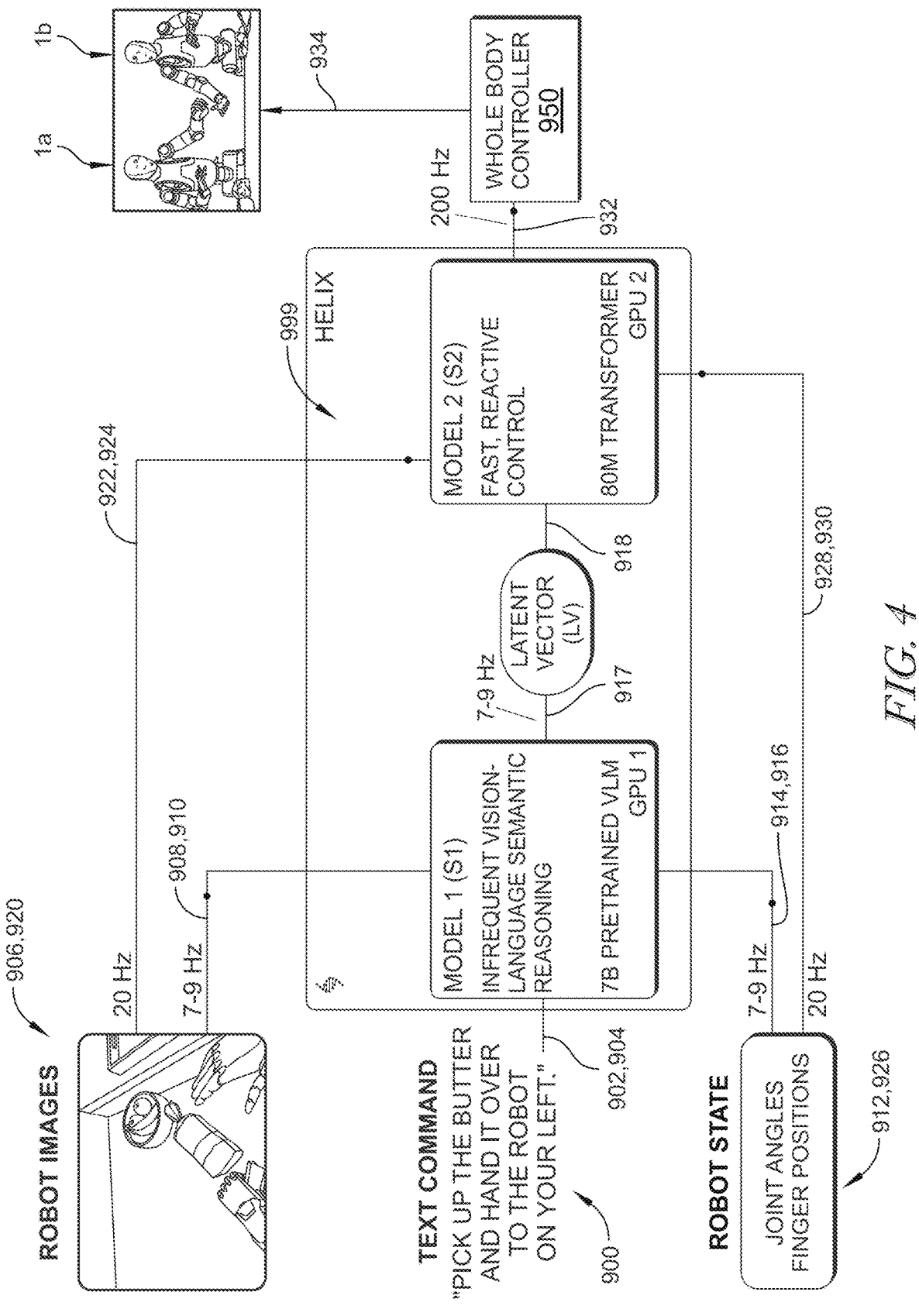
FIG. 4 is a flowchart of a portion of the software system associated with the humanoid robot of FIG. 1.

Each end effector 56a, 56b illustratively includes a housing 562, a thumb assembly 564, and a plurality of finger assemblies 566 as shown in connection with left end effector 56a in FIG. 4. The housing includes (i) a coupling assembly 562.2 and (ii) a main enclosure 562.4. The coupling assembly 562.2 is configured to mount the end effector 56a to the wrist 50a. The end effector 56 moves with the motion of the wrist 50. The main enclosure 562.4 is configured to at least partially house a portion of the thumb assembly 564 and the individual finger assemblies 566 extending from the housing 562. The thumb assembly 564 and individual finger assemblies 566 include a plurality of actuators, linkages, and associated electronics and wiring. The main enclosure 562.4 includes a palm surface 562.4.2 (FIG. 2) and an opposite dorsal surface 562.4.4. The thumb assembly 564 and individual finger assemblies 566 are configured to at least curl inward (articulating at various knuckle joints along the thumb and finger assemblies 564, 566) towards the palm surface 562.4.2 from a neutral open position. For example, the finger and thumb assemblies 564, 566 are configured to collectively grasp objects or utilize one or more thumb/fingers at a time. Additional disclosure regarding these end effectors is disclosed within the following applications, which are fully incorporated herein by reference PCT/US25/ 11450, PCT/US25/10425, Ser. No. 19/006,191, Ser. No.

Unlike conventional designs that rigidly fuse medial and distal assemblies, the disclosed thumb assembly instead links these parts so that the medial assembly can move somewhat independently while still driving the distal assembly. This approach yields an underactuated system that flexes, curls, or rotates around an object without the need for multiple actuators. In fact, only two motors drive linkages that deliver four degrees of freedom (DoF), resulting in an end effector with at least 12 DoF and, preferably, 16 DoF.

The thumb assembly is the use of a direct drive linkage system paired with a single biasing member (for example, a spring). This arrangement removes the need for several biasing elements that conventionally force the thumb into an open or neutral position. Eliminating multiple springs means the motor doesn't have to overcome excessive biasing forces, thereby enhancing durability (since springs can degrade over time) and simplifying control by applying a consistent force on the housing regardless of movement direction. Furthermore, the direct drive linkages incorporate nesting components. Each link is supported by coupling points on both sides of a central plane, rather than just one side, which significantly improves the durability of the assembly. The proximal portion of the thumb assembly is also divided into two parts: one that is directly driven by the motor and another (the proximal housing) that uses bearings to allow controlled slippage when encountering resistance. This means that even if one part of the assembly stops moving, the motor can continue to drive other components.

Another notable aspect is the placement of two motors within the palm of the end effector. One motor manages adduction/abduction while the other controls flexion/extension, creating a compact package capable of controlling multiple thumb movements. In addition, the thumb assembly is designed as a modular, removable unit—potentially even hot-swappable. By localizing motors, PCBs, encoders, and other electronics within the assembly rather than spreading them throughout the end effector or robot, maintenance becomes easier and the overall cost of ownership is reduced. The design also eliminates several conventional components such as pulleys and force sensors, thereby further reducing complexity and improving serviceability.

Similarly, the finger assemblies are designed with comparable principles. Components within each finger assembly can be linked or fixed so that movement in one part produces movement in another. Unlike systems that permanently fuse the medial and distal segments, the disclosed design links them to allow some independent movement while still transmitting motion. This underactuated design permits each finger to flex, curl, or rotate around objects using only a single motor that provides three DoF per finger, resulting in an end effector with at least 12 DoF and ideally up to 16 DoF. The design may employ four identical finger assemblies arranged in a single plane (Y-Z) and offset in the X-Y and X-Z planes. Using identical assemblies minimizes the number of unique components, enhances modularity, and reduces costs. Alternatively, the design can be configured into two sets of two identical assemblies, ensuring consistency and simplicity. Each finger assembly is also a self-contained, modular unit that can be easily removed or replaced. With all necessary components (motors, PCBs, encoders, etc.) housed within each assembly, there is no need for additional systems—such as pulleys, cables, or pneumatic/hydraulic mechanisms—to be distributed throughout the robot. This full containment not only simplifies the overall design but also improves serviceability and reduces maintenance costs.

As with the thumb assembly, each finger assembly utilizes a direct drive linkage with a single biasing member. This design removes the need for multiple springs, thereby lessening the load on the motor and increasing the system's durability. The nesting of linkage components, supported on multiple sides, further reinforces the mechanical robustness compared to conventional single-sided coupling. In some embodiments, the entire end effector may also offer improved energy efficiency. With fewer components like pulleys and cables and the use of a single motor per finger assembly, power consumption is reduced, potentially extending operating times for the robot 1. The simplified mechanical structure enhances reliability, reduces maintenance requirements, and improves the grasping adaptability of the fingers-allowing them to conform naturally to a variety of object shapes. Moreover, the compact, integrated design can result in a slimmer profile that enables operation in confined spaces, thereby expanding the potential applications of the robot.

b. Wrist

To position the end effector 56 for a specific task, the movement of the entire arm 5 is taken into account to ensure precise and efficient positioning. The upper arm assembly 24 is equipped with multiple actuators, denoted as J1, J2, J3, and J4, which provide the primary motion control for the arm 5. These actuators enable complex articulation, including the positioning of the elbow joint, which in turn influences the orientation and movement of the lower arm that extends from the upper forearm 40. As detailed further below, the lower arm assembly is integrated with additional actuators, designated as J5, J6, and J7, which augment the range of motion necessary for accurately positioning the end effector 56 in three-dimensional space. As illustrated in FIGS. 4 and 7-11, the left and right wrists (50*a*, 50*b*) serve as the pivotal connection points between the corresponding end effectors (56*a*, 56*b*) and the lower forearms (46*a*, 46*b*), while simultaneously permitting controlled relative rotation. This rotational movement is facilitated through a combination of actuators, mechanical linkages, and integrated electronic components, including the necessary wiring harnesses housed within the wrists.

Unlike conventional lower arm assemblies, which may exhibit limitations in range and control, the present design features an advanced three-degree-of-freedom mechanism. The three rotational axes for these degrees of freedom are mutually perpendicular and intersect at a single point, rather than being offset. This geometric alignment ensures superior maneuverability and precise control of the end effector's orientation and movement compared to traditional offset-axis assemblies. The improved design minimizes the cumulative effect of backlash and mechanical play, which enhances stability and repeatability in positioning the end effector. To achieve optimal alignment of the motion axes associated with actuators J6 and J7, the J6 actuator incorporates a linkage system designed to mechanically decouple its movement from that of the end effector. This configuration allows for a dynamic range of motion adjustments. For instance, while the pitch actuator J6, 484 of the wrist moves around axis A6 within a range of −31° to +41°, the actual end effector rotation extends around axis A7 at pivot point P from −70° to +70°.

Introduction of a linkage may inherently introduce minor backlash, which is mitigated by incorporating one or more (e.g., at least 2) advanced encoders, which could be optical, magnetic, capacitive, inductive, resistive, piezoelectric, hall-effect, potentiometric, or ultrasonic. These encoders may facilitate sub-millimeter-level accuracy, critical for applications requiring meticulous movement control. To complement positional data, said actuator may include integrated torque sensors that have strain gauges, piezoresistive sensors, magnetoelastic sensors, capacitive sensors, fiber-optic sensors, or rotary transformers. Additionally or alternatively, the actuators may include current sensors, such as Hall-effect sensors, shunt resistors, fluxgate sensors, Rogowski coils, or magnetoresistive sensors. Furthermore, the system may incorporate micro-electromechanical systems (MEMS) gyroscopes and/or accelerometers, which provide additional sensory data related to orientation, angular velocity, and linear acceleration. This sensory integration enhances the robot's ability to navigate complex environments and maintain stability during operation.

Each of the lower arm actuators (J5-J7) is designed with an advanced motor types, including brushless DC motors, stepper motors, servo motors, coreless DC motors, synchronous AC motors, asynchronous induction motors, linear motors, piezoelectric motors, direct-drive motors, switched reluctance motors, permanent magnet synchronous motors (PMSMs), axial flux motors, and hybrid stepper motors. These motors may employ rare-earth permanent magnets, such as neodymium-iron-boron (NdFeB) alloys, samarium-cobalt (SmCo) magnets, ferrite magnets, alnico magnets, flexible magnets, bonded rare-earth magnets, and high-temperature permanent magnets, to achieve high torque density and energy efficiency. Motor windings may include high-conductivity copper wire with advanced ceramic or polyimide insulation for superior thermal and electrical performance. The motors may be coupled with various high-reduction gear mechanisms designed for precision and load handling, such as strain wave gearboxes (e.g., Harmonic drives), cycloidal reducers, planetary gearboxes, bevel gear systems, worm gears, parallel shaft helical gear mechanisms, spur gear assemblies, crossed helical gear systems, double-enveloping worm gears, herringbone gears, hypoid gears, rack-and-pinion systems, bevel hypoid gears, epicyclic gear trains, and differential gear systems. Additionally, some implementations may incorporate custom gear profiles optimized for torque transfer efficiency, backlash reduction, and noise minimization. The lower arm actuators J5-J7 are engineered for high-performance torque delivery, with a momentary peak torque capacity ranging between 17.6 and 26.4 N·m. The preferred operating range is optimized between 19.8 and 24.2 N·m to balance power efficiency and mechanical stress distribution. These actuators operate without internal wiring and are coupled to a control PCB that is housed within the lower forearm.

Figure 9:
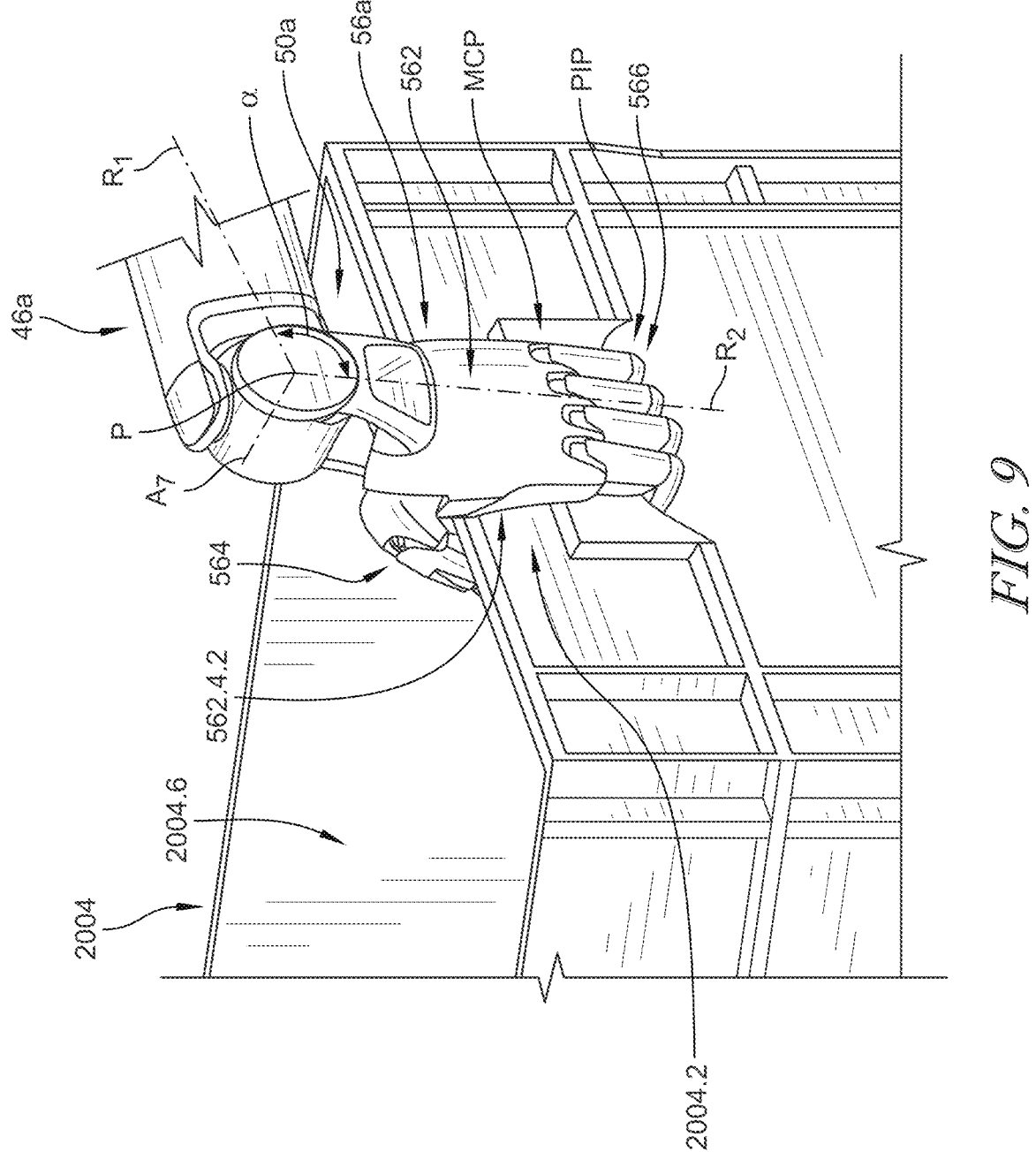
FIG. 9 is a perspective view of the identified bin from FIG. 7 showing a thumb assembly and finger assemblies of the left end effector of the robot extending around a portion of one of the end handles of the bin in preparation for lifting the identified bin from the stack of bins as shown in FIG. 10.
Figure 11:
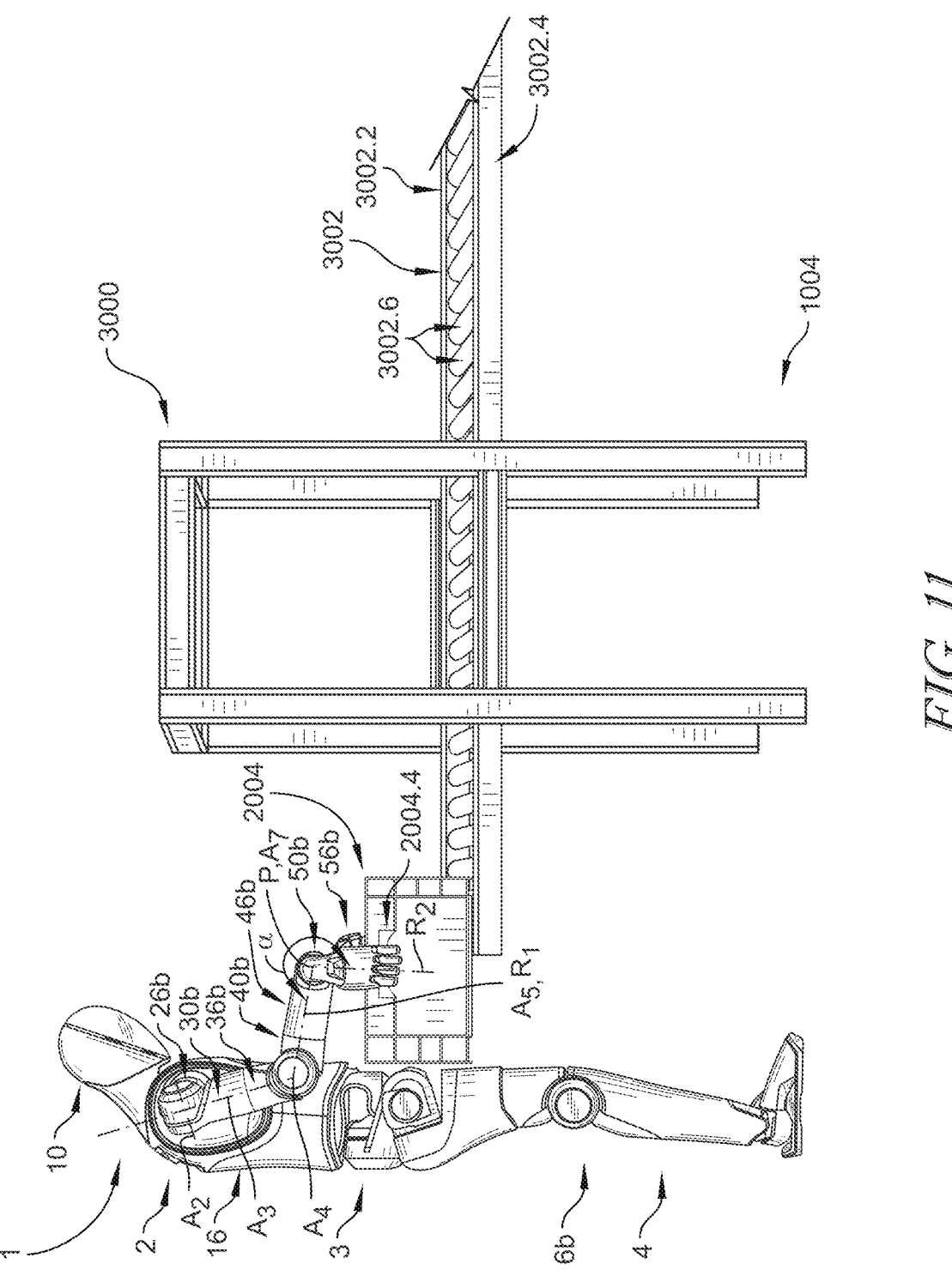
FIG. 11 is a perspective view of the robot of FIG. 9 showing the robot moving the identified bin to another location and aligning the identified bin with a conveyor in preparation for placement of the bin on the conveyor.
Figure 12:
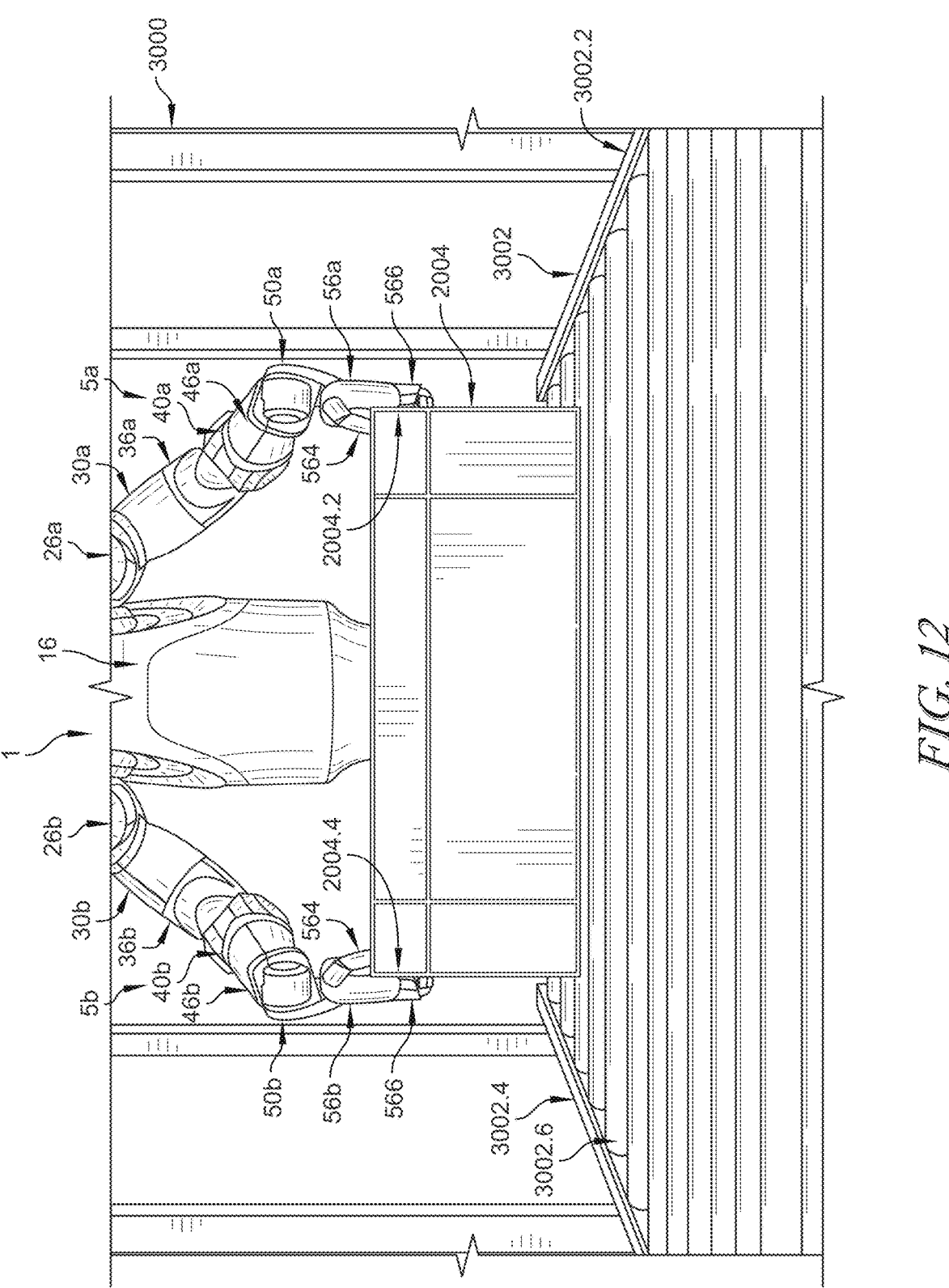
FIG. 12 is a perspective view of the humanoid robot of FIG. 10 showing the robot aligning the bin between rails of the conveyor and onto rollers of the conveyor in preparation for release of the bin by the end effectors of the robot in order to complete the exemplary task.

As best shown in FIGS. 3, 9, and 11, the arms 24 include an arm or first reference line $R_1$ that extends along a central axis, mid-width, or along the arms 24. The left and right end effectors 56a, 56b also include an end effector or finger reference line $R_2$ that extends along a central axis of the middle finger, a middle extent of the end effector 56a, 56b, or along an extent of said end effector 56a, 56b. In a neutral or unrotated position, the first reference line $R_1$ is colinear with a second reference line $R_2$. However, in a max-out state, the second reference line $R_2$ rotates from being colinear with the first reference line $R_1$ to being colinear with a third reference line $B_1$. In this state, an outward angle $\theta_1$ is formed between the first and second reference lines. Said angle $\theta_1$ is configured to be between 290 degrees when the end effector 56 is in a Max-in position and 70 degrees when the end effector 56 is in the Max-out position. In this Max-in position, the second reference line $R_2$ rotates from being colinear with the first reference line $R_1$ to being colinear with a fourth reference line $B_2$. Likewise, angle $\theta_2$, which is the opposite of $\theta_1$, which is an inward angle that is configured to be between 290 degrees when the end effector 56 is in a Max-out position and 70 degrees when the end effector 56 is in the Max-in position.

Based on the above, left and right wrists 50a, 50b are configured to move the left and right end effectors 56a, 56b through a downward (e.g., opposite of the thumb assembly 564) angle α relative to a reference line A of the left and right lower forearms 46a, 46b, respectively, as illustratively shown in connection with left end effector 56a in FIG. 4. In some embodiments, the angle α is greater than 0 degrees and is less than 120 degrees, preferably greater than 50 degrees and is less than 105 degrees, and most preferably greater than 80 degrees and is less than 100 degrees. In some embodiments, the left and right wrists 50a, 50b are also configured to move the left and right end effectors 56a, 56b through an upward (e.g., in the direction of the thumb assembly 564) angle β relative to the reference line $R_1$ of the left and right lower forearms 46a, 46b, respectively. In some embodiments, the angle β is greater than 0 degrees and is less than 120 degrees, preferably greater than 50 degrees and is less than 105 degrees, and most preferably greater than 80 degrees and is less than 100 degrees.

The range of motion of the end effectors 56a and 56b about rotational axis A7, which is a pivot point P, between angles α and β exceeds typical human capabilities of between 45-65 degrees, thereby enhancing the efficiency of robot 1 in executing tasks while maximizing its available range of movement. This expanded range compensates for potential mechanical limitations in other regions of the robot 1 compared to a human body. Importantly, the robot's movements are not constrained by the need to replicate human biomechanics. Instead, motion control can be optimized for power efficiency, time efficiency, or both, depending on the task at end effector. For instance, whereas a human performing a lifting task may continuously adjust the position of their arms and end effectors throughout the process of lifting, carrying, and setting down a loaded bin, the robot 1 can instead optimize its movements by positioning the bin in an ideal location relative to its torso 16 and maintaining that position throughout transport. By doing so, the robot 1 minimizes the need for continuous actuation of multiple joints, thereby reducing overall energy consumption. This efficiency is achieved by limiting unnecessary actuation of motors and actuators that would otherwise be engaged if the robot merely imitated human motion patterns.

Additionally, maintaining the loaded bin in close proximity to the robot's torso 16 while in motion provides structural and dynamic advantages. This configuration reduces the effective weight distribution on the robot's joints, mitigating excessive torque and stress that could otherwise compromise mechanical longevity or require additional power expenditure for balance and stabilization. Moreover, the structural design of the robot's end effector and wrist enables a near-vertical or substantially vertical approach when grasping the edges of the bin. This orientation enhances the robot's ability to securely grip, lift, and maneuver the bin with precision and stability. By leveraging this optimized grasping technique, the robot 1 improves its overall end effectors efficiency, ensuring more reliable and effective manipulation of objects in a variety of operational environments.

3. Aspect of the Robot's Software Design

The following paragraphs described an aspect of the robot's software design, including its architecture, methods that may be used to train models contained in its architecture, use of said architecture, and benefits associated with the architecture. It should be understood that the disclosed robot is not limited to this disclosed architecture, as other architectures are contemplated by this disclosure.

a. Architecture

As detailed herein, the robot 1 is capable of completing one or more tasks. To enable the robot to perform these tasks, the robot includes local or remote access to a computer running Helix 999 that includes:

A first artificial intelligence algorithm S1, and preferably a first pre-trained transformer based generative artificial intelligence algorithm, that is configured to: (i) receive a command by natural language or other means (step 900), (ii) process said command into text (step 902), (iii) tokenize the text to enable S1 to use said data (step 904), (iv) receive robot sensor data (step 906), (v) process sensor data (step 908), tokenize sensor data to enable said sensor data to be use by S1 (step 910), (vi) receive current position and rotational data of the robot (step 912), (vii) process current position and rotational data of the robot (step 914), (viii) tokenize current position and rotational data of the robot to allow S1 to use said data (step 916), and (ix) output processed S1 data to the latent vector (step 917);

A second artificial intelligence algorithm S2, and preferably a second pre-trained transformer based generative artificial intelligence algorithm, that is configured to: (i) receive processed data from the first artificial intelligence algorithm S1 through a latent vector (step 918), (ii) receive robot sensor data (step 920), (iii) process sensor data (step 922), tokenize sensor data to allow S2 to use said data (step 924), (iv) receive current position and rotational data of the robot (step 926), (v) process current position and rotational data of the robot (step 928), (vi) tokenize current position and rotational data of the robot to allow S2 to use said data (step 930), and output data to the whole body controller (step 932).

The positions and rotations that Helix 999 outputs in step 932 are then provided to a whole body controller 950 of the robot 1, and said whole body controller 950 can translate these positions and rotations to actuator controls in step 934 in order to allow the robot 1 to perform the identified sub-step. The above steps are repeated until all of the sub-steps that are determined from the first artificial intelligence algorithm S1 or another algorithm are performed, which therefor completes the received command from the user (step 900). In other embodiments, the first and second artificial intelligence algorithms S1, S2 may be combined into a single algorithm, or the first and second artificial intelligence algorithms S1, S2 can be split into several (e.g., between 3 and 20) algorithms or layers within each high-level algorithm.

The first artificial intelligence algorithm S1 can be remotely accessible, locally deployed, or a combination thereof. Additionally, said first artificial intelligence algorithm S1 may be a first pre-trained transformer-based generative artificial intelligence algorithm, which may be based on a multimodal large language model (i.e., MLLM), vision language model (i.e., VLMs), a bipedal action model (i.e. BAM), a combination of both, or a hierarchical arrangement of language models that may include multiple MLLMs, VLMs, BAMs, and/or LLMs. In one example, the first artificial intelligence algorithm S1 may be between a 100 million to 100 billion parameter pretraining MLLM that is operating at 0.1-100 Hz, and preferably 7-9 Hz and is designed to provide language and semantic reasoning to the robot 1.

Like the first artificial intelligence algorithm S1, the second artificial intelligence algorithm S2 can be remotely accessible, locally deployed, or a combination thereof. Additionally, said second artificial intelligence algorithm S2 may be a second pre-trained transformer-based generative artificial intelligence algorithm, which may be based on a MLLMs, VLMs, BAMs, LLMs and/or a hierarchical arrangement thereof. In one example, the second artificial intelligence algorithm S2 may be between a 1 million to 100 million parameter pretraining transformer model or BAM that is operating at range of 1-100 Hz and is designed to provide actuator level control commands to the robot 1. As such, the first artificial intelligence algorithm S1 may be a larger, shower thinking algorithm, while the second artificial intelligence algorithm S2 may be a faster, quicker thinking algorithm.

As described herein, the bipedal action model (i.e. BAM) or latent-conditional visuomotor transformer may be based upon a multimodal large language model (i.e., MLLM) that has been retrained, refined, or modified in any manner using data collected from various sources, which may include: (i) image data, (ii) video data, (iii) text data, (iv) depth data, (v) robot joint trajectories, (vi) robot joint locations, (vii) robot joint location data, (viii) robot joint rotations data, (ix) other robot sensor data, (x) sensor data, (xi) demonstration data, and/or (xii) any combination thereof. In brief, the image data can include but is not limited to: (i) raw image data, (ii) annotated image data, (iii) synthetic data comprising computer-generated images used to augment real image dataset (e.g., in instances where usable data is scarce), and/or (iv) any combination thereof. The video data can include but is not limited to: (i) raw video data, (ii) annotated video data, (iii) synthetic video data comprising simulated video data used to train models on dynamic scenarios and interactions, and/or (iv) any combination thereof. The image data and/or the video data can be received from imaging sensors or cameras that are part of the humanoid robots or other imaging sensors or cameras that are position in an operating environment of the robots. The text data can include but is not limited to: (i) natural language instructions, (ii) dialogue data between/amongst the robots, (iii) machine readable instructions, (iv) natural language mapping data, (v) or any combination thereof. The depth data can include but is not limited to: (i) map data, (ii) point cloud data, (iii) ultraviolet (UV) map data, (iv) and/or any combination thereof. In some implementations, the robot joint trajectories, the robot joint locations, the robot joint location data, and/or the robot joint rotations data can be obtained from teleoperation of one or more of the robots. The other robot sensor data can include but is not limited to: (i) inertial measurement unit (IMU) data, (ii) force data, (iii) torque data, (iv) proximity sensor data, and/or (v) any combination thereof. The sensor data can include any sensor data described herein. The demonstration data can include human demonstration and/or robot demonstration data. The human demonstration data can include but is not limited to images, videos, and/or text of humans performing one or more commands and/or tasks. The human demonstration data can therefore depict how robots should behave when collaborating with each other. The human demonstrations can include human operators acting as robots in long-horizon and/or multi-turn dialogue and coordinated action(s). The robot demonstration data can include but is not limited to images, videos, and/or text of the robots performing the commands and/or tasks. This data can include first-person robot videos that depict each robot's experience in some long-horizon and/or multi-turn dialogue and coordinated action(s). Any of the data received in blocks can include or be related to/associated with text or labels describing what each robot says and/or does. It should be understood that the data may be labeled or unlabeled.

b. Training Helix

The training process for the Helix 999 employs several advanced techniques to optimize performance, enhance generalization, and improve the integration between high-level semantic reasoning and low-level motor control. A fundamental aspect of this training methodology is the use of an extensive multi-robot, multi-operator teleoperated dataset. This dataset encompasses a diverse range of manipulation tasks, object interactions, and environmental conditions, ensuring that the model develops robust generalization capabilities across varied operational scenarios. The inclusion of multiple robot morphologies within the dataset enables Helix to learn collaborative behaviors and adapt to different physical embodiments, while the variability introduced by multiple human operators enhances task execution flexibility by exposing the system to different movement strategies, grasping techniques, and execution styles.

The teleoperated dataset can encompass a wide range of training data, including all data types and formats described herein. This dataset serves as a crucial foundation for training Helix, an advanced robotic system, by providing diverse and representative examples of real-world interactions. To enhance the efficiency and scalability of Helix's learning process, a specialized auto-labeling technique is employed, enabling the automated generation of natural language-conditioned training pairs. This approach significantly reduces the reliance on costly, labor-intensive human annotation while maintaining high-quality, contextually relevant labels. In this auto-labeling method, a pretrained MLLM or VLM analyzes segmented video clips captured by the robot's onboard cameras during teleoperated or autonomous operation. The MLLM or VLM processes these video segments and extracts meaningful contextual information, which it then uses to generate textual descriptions that correspond to the observed actions. By formulating queries such as, "What instruction would have led to the action seen in this video?", the MLLM or VLM can produce hindsight instructions that accurately describe the behaviors demonstrated in the footage. These hindsight instructions effectively serve as labels, linking specific robot actions to natural language commands that reflect human-like instructions.

This automated labeling process offers several advantages over traditional human annotation methods. First, it streamlines dataset preparation by eliminating the need for extensive manual labeling, reducing both time and cost. Second, it results in training data that is more naturally structured, as the generated commands closely resemble how humans would typically instruct a robot, making the dataset more applicable to real-world deployment. Third, the MLLM or VLM's capacity to analyze visual and contextual cues allows it to capture subtle task-related details that human annotators might overlook, thereby strengthening the relationship between the instructions and corresponding robot actions. This improved granularity and precision enhances the model's ability to generalize across diverse tasks, improving overall performance and adaptability. In other embodiments, the generation of natural language-conditioned training pairs may be performed through human annotation alone, where skilled annotators manually review video footage and create corresponding instructions. Additionally, a hybrid approach may be utilized, combining both human expertise and machine-generated suggestions. In such an approach, the model may generate preliminary labels, which are then reviewed, modified, or validated by a human. The human oversight process can be continuous or selectively triggered based on the model's confidence level (e.g., a human reviewer may only intervene when the model's certainty falls below a predefined threshold). This adaptive verification mechanism ensures both efficiency and accuracy, leveraging the strengths of both automated processing and human intuition.

Once the training data has been collected, Helix 999 can be trained using an end-to-end optimization strategy that simultaneously trains the first and second artificial intelligence algorithms S1, S2. This integrated method ensures that the high-level semantic representations produced by the first artificial intelligence algorithm S1 are effectively used by the second artificial intelligence algorithm S2, resulting in seamless execution of task commands in practical settings. Unlike traditional modular approaches—where high-level planning and low-level control are developed separately—Helix's unified training framework promotes continuous information exchange between the first and second artificial intelligence algorithms S1, S2, fostering more coherent and goal-directed behaviors. This unified training framework is facilitated by the use of a temporal offset between the inputs fed to the first and second artificial intelligence algorithms S1, S2. This offset is precisely tuned to counterbalance the inference latency differences between the two components, thereby mimicking real-time deployment conditions during training. By anticipating the delay between the first artificial intelligence algorithm S1's decision-making and the second artificial intelligence algorithm S2's execution cycles, the system is trained to maintain robust performance even in dynamic, fast-changing environments. This latency-aware strategy directly addresses a common challenge in robotic learning, where models developed in idealized, offline conditions often struggle with real-world sensor delays, computational bottlenecks, or unforeseen execution dynamics.

To achieve smooth coordination between the first artificial intelligence algorithm S1 high-level reasoning and the second artificial intelligence algorithm S2 reactive control, the training framework employs a latent communication vector that acts as a conduit between the two subsystems. This vector encapsulates key features extracted from the first artificial intelligence algorithm S1's vision-language processing pipeline, including task-relevant spatial relationships, object affordances, and prioritized actions. By enabling backpropagation through this channel, the framework allows gradients to flow between the first and second artificial intelligence algorithms S1, S2, ensuring that both components are jointly optimized for consistent task execution. The bidirectional information flow also helps to refine discrepancies between the actual and desired motion outputs, enhancing both S1's understanding of task semantics for a more context-aware and adaptive robotic system and the second artificial intelligence algorithm S2's motor policies. The loss function in training uses a standard regression-based fine-tuning approach, mapping raw pixel inputs and language commands directly to continuous motor actions. In contrast to discrete action prediction frameworks which segment robot behaviors into fixed motion primitives-Helix's continuous-action training strategy develops high-resolution motor policies that enable smooth, fluid, and precise movements. This is especially useful for dexterous manipulation tasks, where achieving the precise coordination of force application, contact stability, and dynamic regrasping is essential.

c. Use of Helix

Once trained, the robot can use Helix 999 to determine and control actions of the robot necessary to perform a given command or sub-steps of a command based on information from multiple sources. Wherein said multiple sources may include: (i) an audio or speech input prompt to perform a task, (ii) image data from onboard or remote cameras, and (iii) robot data, which may include current positional and rotational locational data. The output from the Helix may include: (i) position information (e.g., desired position of the wrist—X, Y, Z), (ii) location(s), which may include one joint position (X, Y, Z) or more than one joint position, (iii) changes in positions (e.g., $\Delta X$, $\Delta Y$, $\Delta Z$), (iv) changes in location(s) (e.g., $\Delta X$, $\Delta Y$, $\Delta Z$), (v) rotational position (e.g., $A°$, $B°$, $C°$), (vi) rotational locations (e.g., $A°$, $B°$, $C°$), changes in rotational position (e.g., $\Delta A°$, $\Delta B°$, $\Delta C°$), and/or changes in rotational location(s) (e.g., $\Delta A°$, $\Delta B°$, $\Delta C°$). The output from the Helix can then be provided to the whole body controller to translate the output from the Helix to the joint positions for every actuator (e.g., all 42 actuators) contained in the humanoid robot.

d. Summary

Helix is trained fully end-to-end, directly mapping raw pixel inputs and text commands to continuous actions without relying on a standard regression loss. This enables Helix to perform long-horizon, collaborative, and dexterous manipulation on the fly, without the need for task-specific demonstrations or extensive manual programming. Notably, Helix can coordinate a 35-DoF action space at 200 Hz-preferably at this level-allowing precise control over individual finger movements, end-effector trajectories, head gaze, torso posture, and even leg and foot positioning. These capabilities address a fundamental limitation of conventional robots, which struggle to generalize from past data and perform tasks in unfamiliar environments, with unseen objects or backgrounds. As such, the disclosed technology provides technical solutions to such technical problems.

For example, the disclosed technology provides real-time analysis and processing of data from many sources using comprehensive, trained Helix that are deployed on the edge (e.g., at the humanoid). These complex and uniquely trained Helix or other similar models: (i) reduce processing time, (ii) improve consumption of available resources, (iii) enable the Helix 999 to perform respective tasks more effectively and more efficiently than the conventional systems for controlling the humanoid. This downstream use of the Helix advantageously reflects a solution to technical issues related to conventional systems and thus can improve existing technology for controlling humanoids and other types of robots. In other words, conventional systems may not accurately determine the next actions to be performed by the humanoid in real-time as the humanoid is performing actions in order to cause the humanoid to seamlessly perform a set of actions to accomplish the human-desired task. This edge processing therefore provides lightweight and fast results with the available compute resources, allowing for accurate and seamless movement of the humanoid to perform the human-desired task in real-time.

Moreover, deploying trained Helix 999 at the edge allows for humanoid controls to be determined, executed, and adapted in real-time and on the fly, even when network communications are weak or nonexistent. This technical solution allows for the controls to be determined, executed, and adapted regardless of any networking interruptions, which is not realized by the conventional systems that lack lightweight and dynamic deployment of Helix on the edge to control humanoids. Additionally, the disclosed technology may not be reasonably performed in the human mind, as the human mind is incapable of continuously receiving and processing hundreds to thousands of disparate data points from different sources (e.g., human speech, cameras, motion sensors, torque sensors, inertial sensors, sound sensors, touch sensors, proximity sensors, and/or environmental sensors), analyzing and tokenizing those data points in real-time using trained Helix 999 on the edge, and then generating relevant output such as controls for causing the humanoid to seamlessly perform actions to complete a human-desired task in real-time. The human mind is also incapable of iterative processing the disparate data points from the different sources as the humanoid performs actions to determine the next humanoid movements. Additionally, the human mind is incapable of iteratively processing the disparate data points from different sources to train and improve the BAMs that are deployed on the edge. Sometimes, the Helix can be locally trained and improved on the edge, at the humanoid, thereby allowing for fast, efficient, and lightweight deployment of the improved Helix at the humanoid.

4. Performance of Tasks

As shown in FIGS. 2-12, one exemplary task includes moving bins within a facility 1000. For example, the robot 1 may be programmed to execute a command such as "place the full bins on the conveyor." As described above, the command, along with data received by the robot 1, such as visual inputs from its surroundings, is processed by its control system and translated into one or more steps and sub-steps necessary for task completion. These steps involve precise motion planning, real-time environmental awareness, and the selective operation of the robot's actuators to manipulate objects efficiently.

Figure 5:
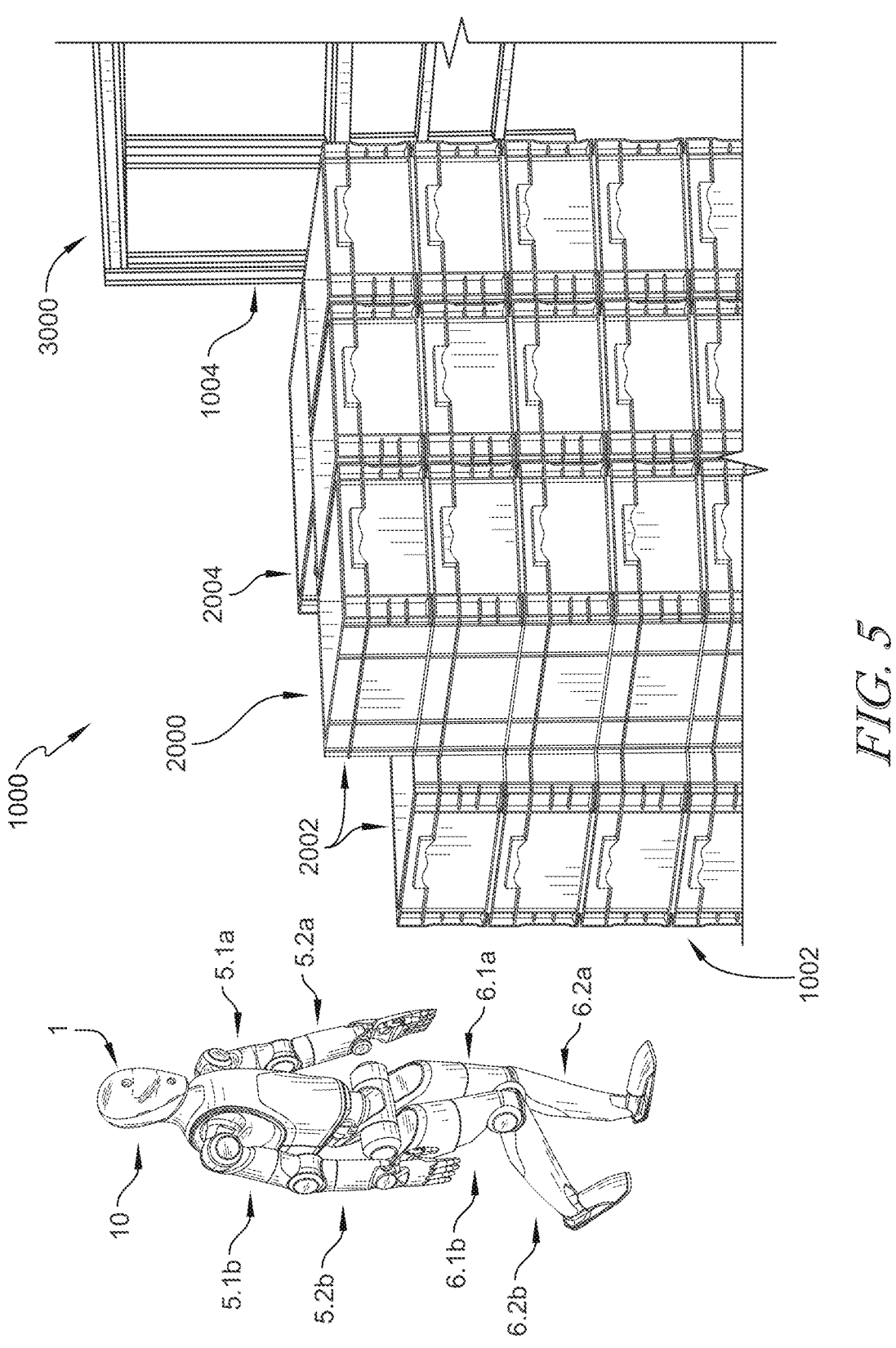
FIG. 5 is a perspective view of the humanoid robot of FIG. 1 who is approaching a stack of bins as part of an exemplary task of moving the bins from one location within a facility to another location within the facility.
Figure 6:
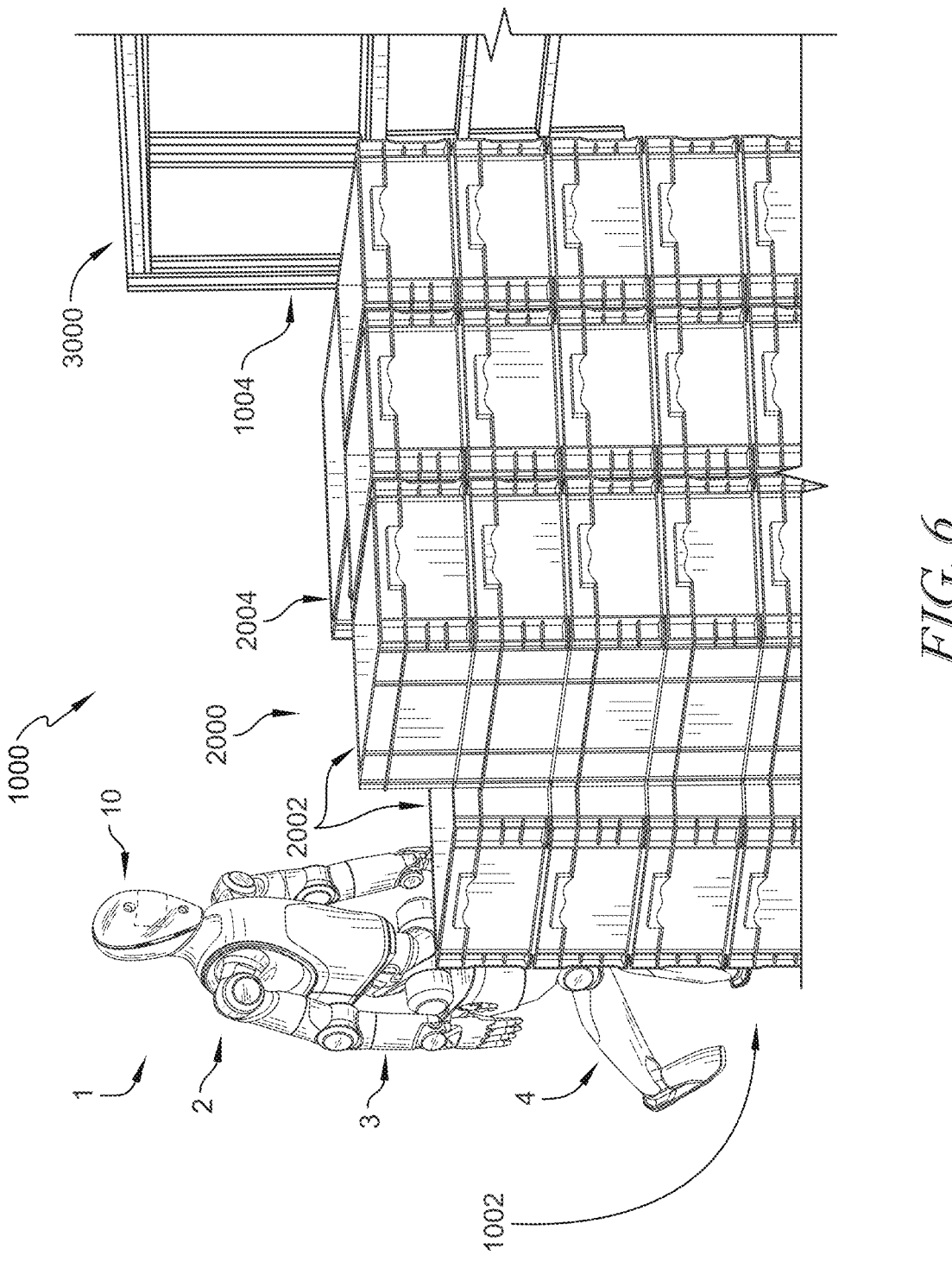
FIG. 6 shows the humanoid robot of FIG. 1 approaching the stack of bins for identification of a particular bin within the stack that is prepared for movement to another location.
Figure 7:
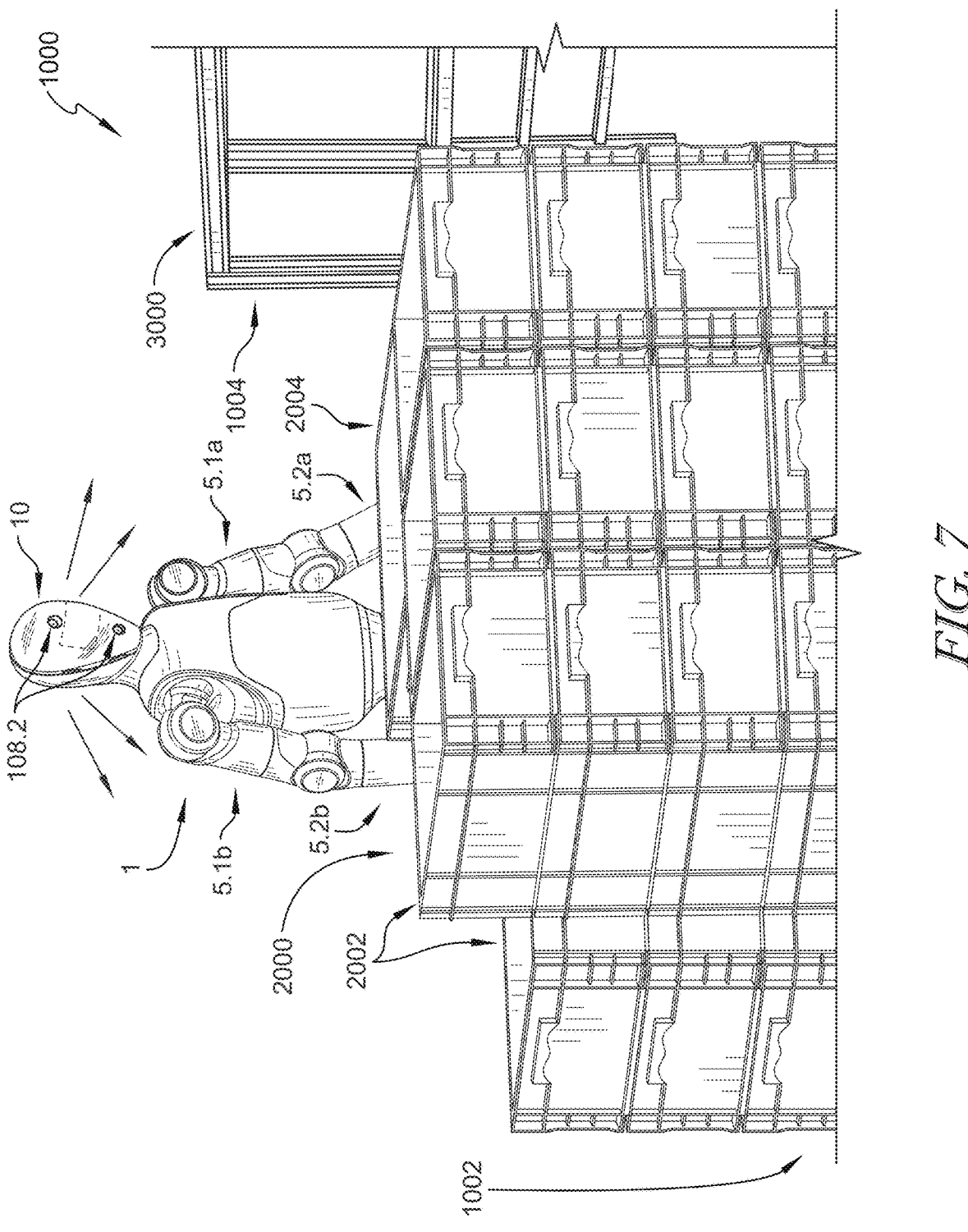
FIG. 7 shows the humanoid robot of FIG. 1 arriving at the stack of bins in front of a bin prepared for movement to another location.
Figure 8:
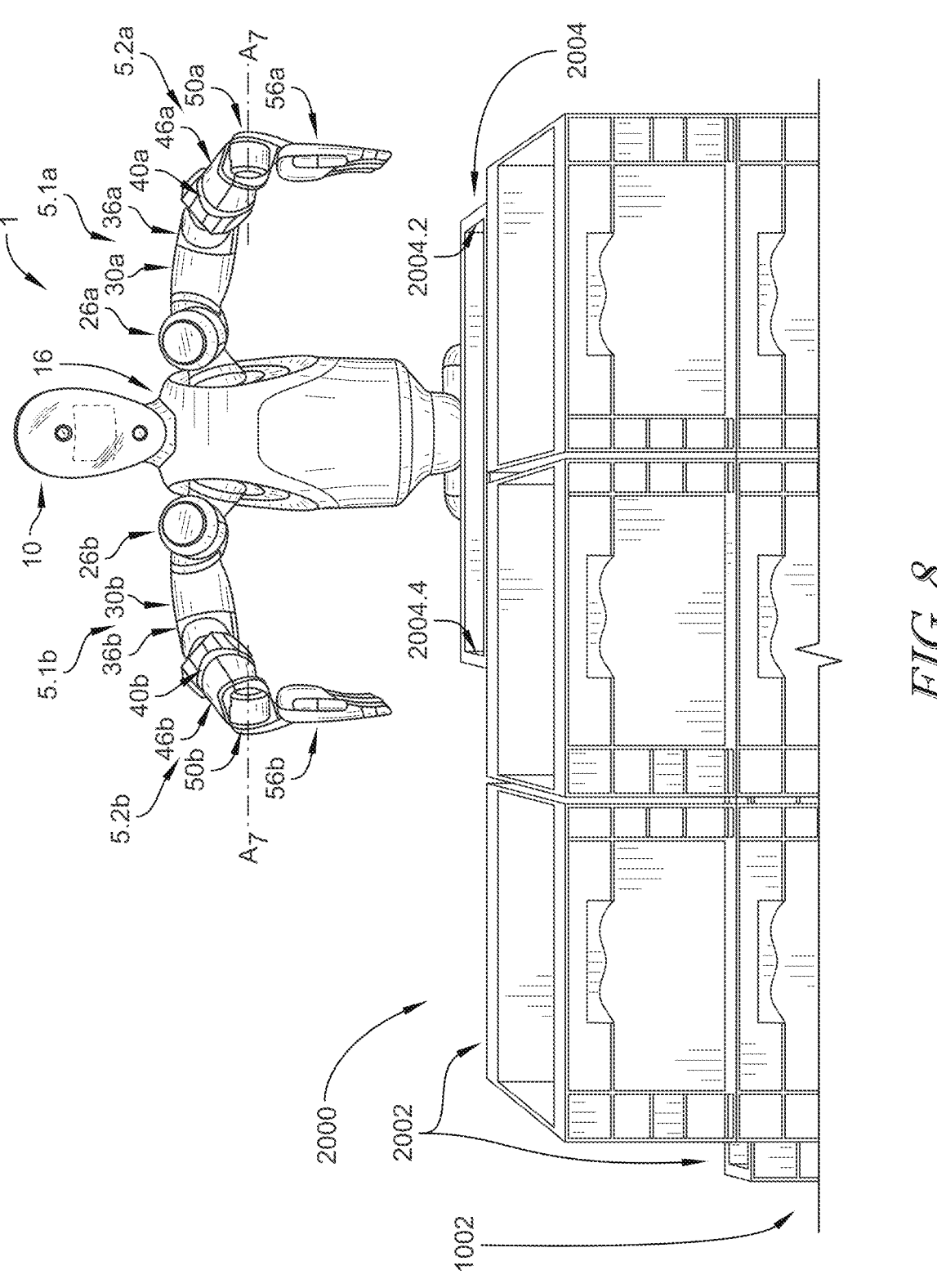
FIG. 8 shows the upper arm assemblies of the humanoid robot of FIG. 1 extended over the identified bin and the end effectors of the robot rotated relative to the upper arm assemblies to extend toward end handles of the bin in preparation for movement of the end effectors toward the end handles for gripping thereof.
Figure 10:
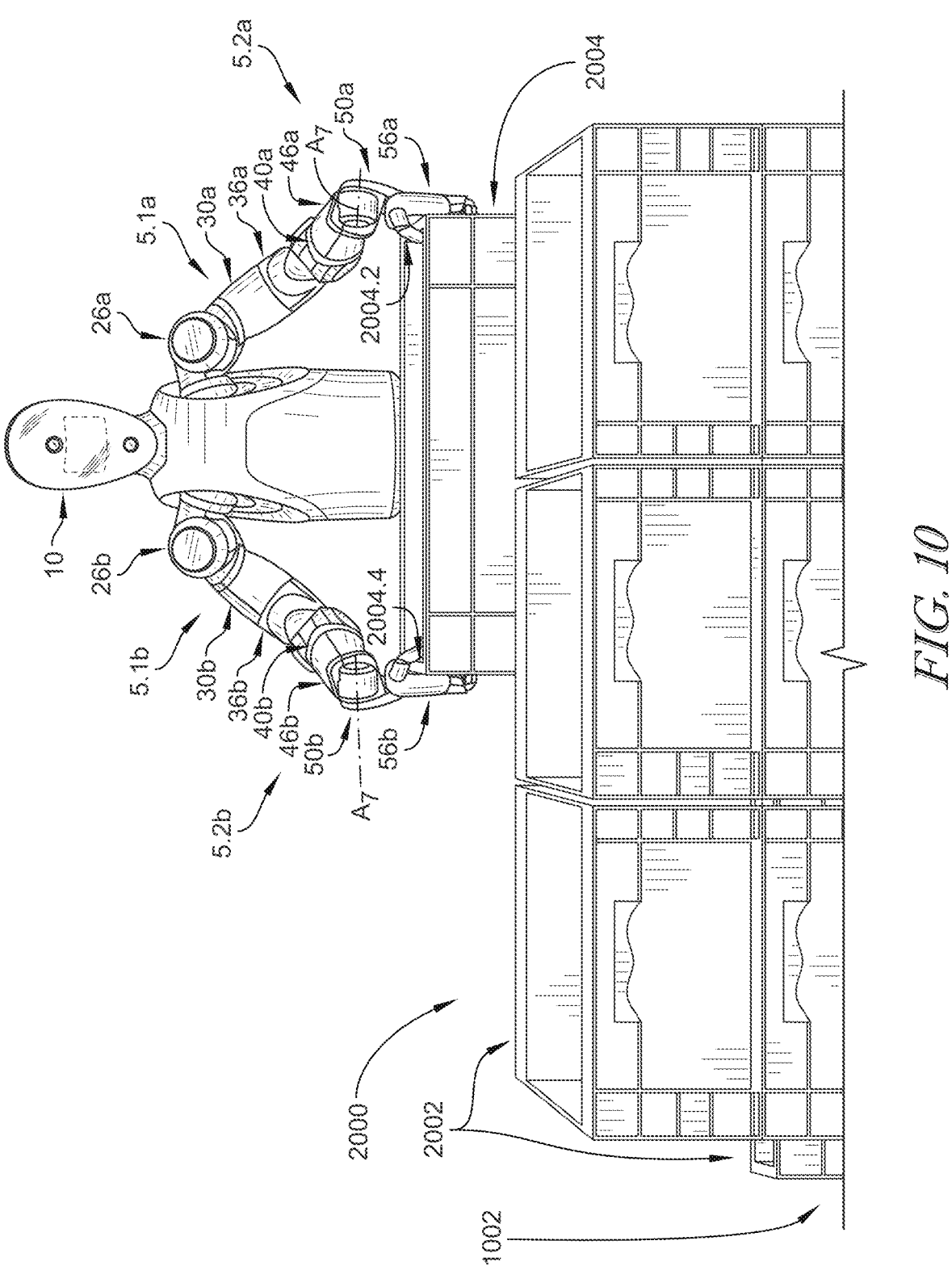
FIG. 10 shows the humanoid robot of FIG. 1 lifting the bin from the stack of bins in preparation for movement of the bin to another location.

For example, to execute the command, the robot 1 may perform the following sequential steps:
i) Navigating towards a designated area 1002 within the facility 1000, where a stack 2000 of bins 2002 is arranged (FIGS. 1 and 5). Navigation may be achieved using a combination of sensors (e.g., stereo vision), visual SLAM (Simultaneous Localization and Mapping), and/or pre-mapped facility layouts to ensure optimal path planning and obstacle avoidance.
ii) Identifying a full bin 2004 within the stack 2000 (FIG. 6) using a combination of vision-based recognition (e.g., deep learning-based object classification), weight sensors and/or RFID scanning to determine the fill status of each bin 2002.
iii) Picking up the identified full bin 2004 (FIGS. 7-9) through a multi-step grasping and lifting operation: a) Moving into an optimal position in front of the identified bin 2004, ensuring alignment with its graspable features such as end handles 2004.2, 2004.4. b) Extending upper arm assemblies 20a, 20b to reach the bin 2004 and adjusting the orientation of end effectors 56a, 56b to securely grasp the bin handles 2004.2, 2004.4 at an angle α for optimal lifting leverage. c) Engaging the end effectors 56a, 56b with the bin handles 2004.2, 2004.4 by placing the palm sections 562.4.2 on the handles while the thumb assemblies 564 extend into the bin interior 2004.6 and the finger assemblies 566 secure the exterior of the bin 2004. d) Actuating the end effectors 56a, 56b to firmly grip the handles by curling the thumb and finger assemblies 564, 566 around them, ensuring a stable grasp (FIG. 8). e) Lifting the bin 2004 off the stack 2000 using coordinated actuator control to apply sufficient force while maintaining stability (FIG. 9).
iv) Transporting the bin 2004 to another area 1004 within the facility 1000 containing a conveyor 3000 (FIG. 10). During transport, the robot 1 continuously monitors its surroundings to avoid collisions and dynamically adjusts its walking trajectory using real-time sensor feedback.
v) Placing the bin 2004 onto the conveyor 3000 (FIG. 11) by performing the following sub-steps: a) Aligning the bin 2004 with the track 3002 of the conveyor 3000, ensuring proper positioning between guide rails 3002.2, 3002.4 above rollers 3002.6. b) Lowering the bin 2004 onto the rollers 3002.6 in a controlled manner to prevent impact-related damage. c) Releasing the grip on the bin 2004 by disengaging the end effectors 56a, 56b, ensuring a smooth transition of the bin onto the conveyor system.

Throughout these steps, the robot 1 selectively operates its actuators to mimic human walking, stabilize carried loads, and provide real-time feedback on task completion. For example, before lifting a bin, the robot 1 verifies that the bin is within an accessible range of the end effectors 56a, 56b, ensuring successful grasping and lifting without unnecessary energy expenditure.

The described series of steps can be repeated as needed to complete the command. If multiple full bins 2004 are detected within the stack 2000, the robot 1 systematically returns to retrieve and place each full bin onto the conveyor 3000 until all designated bins are moved. Task parameters such as the number of bins, bin status, and real-time environmental changes are continuously evaluated to adapt the execution plan dynamically. Additionally, fewer or additional steps/sub-steps may be employed based on input variations and environmental conditions. For example, if the robot 1 determines that no bins 2002 in the stack 2000 are currently full, it may adopt an idle state in a designated unobstructive position near the stack 2000 until a bin reaches full capacity or further instructions are provided after a pre-set dwell time. The breakdown of steps into sub-steps allows for enhanced control and precise manipulation. For instance, step iii) above could be decomposed into finer sub-actions such as approach alignment, grasp force calibration, and lift stabilization, each managed through sensor-driven adjustments.

The execution of similar commands can be adapted based on additional input parameters and contextual factors. The controlling model of the robot 1 may be supplemented with a comprehensive digital map of the facility 1000, providing the robot with predefined navigation routes, obstacle locations, and operational landmarks. Furthermore, bins 2002/2004 and key facility structures may be embedded with barcode labels, RFID tags, serial numbers, color coding, or other visual markers, enabling the robot 1 to accurately identify and interact with them using onboard sensors. Additional data regarding the bins 2002/2004 and their contents may be integrated into the robot's decision-making process. This information could include order fulfillment details, shipping manifests, picking reports, or parts lists. Such supplementary data allows the robot 1 to prioritize bin selection based on factors like shipment urgency, weight constraints, or specific inventory tracking requirements, thereby optimizing operational efficiency within the facility 1000. By leveraging an advanced AI-driven control system, the robot 1 can adapt to dynamic workflow changes, refine task execution over time through machine learning techniques, and ensure seamless operation in complex industrial environments.

4. Industrial Application

While the disclosure shows illustrative embodiments of a robot (in particular, a humanoid robot), it should be understood that embodiments are designed to be examples of the principles of the disclosed assemblies, methods and systems, and are not intended to limit the broad aspects of the disclosed concepts to the embodiments illustrated. As will be realized, the disclosed robot, and its functionality and methods of operation, are capable of other and different configurations and several details are capable of being modified all without departing from the scope of the disclosed methods and systems. For example, one or more of the disclosed embodiments, in part or whole, may be combined with a disclosed assembly, method and system. As such, one or more steps from the diagrams or components in the Figures may be selectively omitted and/or combined consistent with the disclosed assemblies, methods and systems. Additionally, one or more steps from the arrangement of components may be omitted or performed in a different order. Accordingly, the drawings, diagrams, and detailed description are to be regarded as illustrative in nature, not restrictive or limiting, of the said humanoid robot.

While the above-described robot is designed as a head for use with a general-purpose humanoid robot, it should be understood that its assemblies, components, learning capabilities, and/or kinematic capabilities may be used with other robots. Examples of other robots include: articulated robot (e.g., an arm having two, six, or ten degrees of freedom, etc.), a cartesian robot (e.g., rectilinear or gantry robots, robots having three prismatic joints, etc.), Selective Compliance Assembly Robot Arm (SCARA) robots (e.g., with a donut shaped work envelope, with two parallel joints that provide compliance in one selected plane, with rotary shafts positioned vertically, with an end effector attached to an arm, etc.), delta robots (e.g., parallel link robots with parallel joint linkages connected with a common base, having direct control of each joint over the end effector, which may be used for pick-and-place or product transfer applications, etc.), polar robots (e.g., with a twisting joint connecting the arm with the base and a combination of two rotary joints and one linear joint connecting the links, having a centrally pivoting shaft and an extendable rotating arm, spherical robots, etc.), cylindrical robots (e.g., with at least one rotary joint at the base and at least one prismatic joint connecting the links, with a pivoting shaft and extendable arm that moves vertically and by sliding, with a cylindrical configuration that offers vertical and horizontal linear movement along with rotary movement about the vertical axis, etc.), self-driving car, a kitchen appliance, construction equipment, or a variety of other types of robot systems. The robot system may include one or more sensors (e.g., cameras, temperature, pressure, force, inductive or capacitive touch), motors (e.g., servo motors and stepper motors), actuators, biasing members, encoders, housing, or any other component known in the art that is used in connection with robot systems. Likewise, the robot system may omit one or more sensors (e.g., cameras, temperature, pressure, force, inductive or capacitive touch), motors (e.g., servo motors and stepper motors), actuators, biasing members, encoders, housing, or any other component known in the art that is used in connection with robot systems.

In other embodiments, other configurations and/or components may be utilized. As is known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. The software code is executable by the general-purpose computer. In operation, the code is stored within the general-purpose computer platform. At other times, however, the software may be stored at other locations and/or transported for loading into the appropriate general-purpose computer system.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. The server functions may be implemented in a distributed fashion on a number of similar platforms, to distribute the processing load.

Hence, aspects of the disclosed methods and systems outlined above may be embodied in programming. Program aspects of the technology may be thought of as "products" or "articles of manufacture" typically in the form of executable code and/or associated data that is carried on or embodied in a type of machine-readable medium. "Storage" type media includes any or all of the tangible memory of the computers, processors or the like, or associated modules thereof, such as various semiconductor memories, tape drives, disk drives and the like, which may provide non-transitory storage at any time for the software programming.

All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the disclosed methods and systems. Volatile storage media include dynamic memory, such as the main memory of such a computer platform. Tangible transmission media include coaxial cables, copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

It is to be understood that the invention is not limited to the exact details of construction, operation, exact materials or embodiments shown and described, as obvious modifications and equivalents will be apparent to one skilled in the art. While the specific embodiments have been illustrated and described, numerous modifications come to mind without significantly departing from the spirit of the invention, and the scope of protection is only limited by the scope of the accompanying Claims. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

It should also be understood that substantially utilized herein means a deviation of less than 15% and preferably less than 5%. It should also be understood that other configuration or arrangements of the above-described components is contemplated by this Application. Moreover, the description provided in the background section should not be assumed to be prior art merely because it is mentioned in or associated with the background section. The background section may include information that describes one or more aspects of the subject of the technology. Finally, the mere fact that something is described as conventional does not mean that the Applicant admits it is prior art.

In this Application, to the extent any U.S. patents, U.S. patent applications, or other materials (e.g., articles) have been incorporated by reference, the text of such materials is only incorporated by reference to the extent that they do not conflict with materials, statements and drawings set forth herein. In the event of such conflict, the text of the present document controls, and terms in this document should not be given a narrower reading in virtue of the way in which those terms are used in other materials incorporated by reference. It should also be understood that structures and/or features not directly associated with a robot cannot be adopted or implemented into the disclosed humanoid robot without careful analysis and verification of the complex realities of designing, testing, manufacturing, and certifying a robot for completion of usable work nearby and/or around humans. Theoretical designs that attempt to implement such modifications from non-robotic structures and/or features are insufficient (and in some instances, woefully insufficient) because they amount to mere design exercises that are not tethered to the complex realities of successfully designing, manufacturing and testing a robot.

The invention claimed is:

1. A humanoid robot, comprising:

a torso;

a left arm assembly coupled to the torso, including a lower forearm, and having a first reference line extending along a central axis of the lower forearm;

a left wrist coupled to the left arm assembly and including at least a rotational axis;

a left end effector coupled to the left wrist and configured to move about the rotational axis, and wherein the left end effector includes a first finger assembly with a second reference line extending along a central axis of the first finger assembly, and wherein the first finger assembly has at least two degrees of freedom;

wherein a first angle is formed between the first and second reference lines when the left wrist is in a first configuration, said first angle being greater than 70 degrees;

wherein a second angle is formed between the first and second reference lines when the left wrist is in a second configuration, said second angle being greater than 70 degrees; and a computer configured to implement:

(i) a first transformer-based artificial intelligence algorithm operates at a frequency between 5 Hz and 20 Hz, having a first number of parameters, and being configured to: (a) receive a natural language command from a human, and (b) generate processed data, (ii) a second artificial intelligence algorithm operates at a frequency between 100 Hz and 300 Hz, having a second number of parameters, and being configured to: (a) receive the processed data from the first transformer-based artificial intelligence algorithm, and (b) provide output data used to control an extent of the left wrist, and (iii) a latent vector that obtains the processed data from the first transformer-based artificial intelligence algorithm and provides data to the second artificial intelligence algorithm, and wherein said latent vector is configured to offset the operational frequency difference between the first transformer-based artificial intelligence algorithm and the second artificial intelligence algorithm;

wherein the first number of parameters is larger than the second number of parameters, and a unified training framework is used to jointly train the first transformer-based artificial intelligence algorithm and the second artificial intelligence algorithm.

2. The humanoid robot of claim 1, wherein the first finger assembly is configured to curl about a lower edge of a handle of a bin to allow the humanoid robot to grasp and lift the bin.

3. The humanoid robot of claim 1, wherein the humanoid robot includes at least 40 degrees of freedom, and wherein more than 60% of said 40 degrees of freedom are located in an upper portion of the humanoid robot.

4. A humanoid robot, comprising:
a head and neck assembly having a camera;
a torso coupled to the head and neck assembly;
a left arm assembly coupled to the torso;
a left wrist coupled to the left arm assembly and including: (i) a wrist pitch actuator with a first rotational axis and a range of motion that is between 50 degrees and 160 degrees, and (ii) a wrist yaw actuator with a second rotational axis and a range of motion that is between 100 degrees and 250 degrees, and wherein the first and second rotational axes are oriented perpendicular to one another; and
a computer having access to:
(i) a first artificial intelligence algorithm configured to: (a) receive a natural language voice command from a human, and images from the camera, and (b) generate processed data at a frequency between 5 Hz and 20 Hz,
(ii) a second artificial intelligence algorithm configured to: (a) receive the processed data from the first artificial intelligence algorithm, and robot state data, and (b) generate motor control actions at a frequency between 50 Hz and 200 Hz, and wherein said motor control actions are used to control an extent of the left wrist, and
wherein the first artificial intelligence algorithm and the second artificial intelligence algorithm are jointly trained end-to-end.

5. The humanoid robot of claim 4, wherein the humanoid robot includes at least 30 degrees of freedom, and less than 10% of the degrees of freedom are located in a lower portion of the humanoid robot.

6. The humanoid robot of claim 4, wherein the end-to-end joint training of the first and second artificial intelligence algorithms includes training on a combination of: (i) video data, (ii) synthetic data, and (iii) robot teleoperation data.

7. The humanoid robot of claim 4, wherein the first artificial intelligence algorithm is a pre-trained vision-language model with more than 500 million parameters.

8. The humanoid robot of claim 4, wherein:
(i) the first artificial intelligence algorithm has a first number of parameters, and
(ii) the second artificial intelligence algorithm has a second number of parameters, and
wherein the second artificial intelligence algorithm has fewer parameters than the first artificial intelligence algorithm.

9. The humanoid robot of claim 4, further comprising a latent vector that transfers data between the first artificial intelligence algorithm and the second artificial intelligence algorithm.

10. The humanoid robot of claim 4, wherein the motor control actions include continuous actions for at least 35 degrees of freedom.

11. The humanoid robot of claim 10, wherein the motor control actions do not only contain discrete actions.

12. The humanoid robot of claim 4, wherein the motor control action includes data related to at least 35 degrees of freedom.

13. The humanoid robot of claim 1, wherein the output data does not only contain discrete actions.

14. The humanoid robot of claim 1, wherein the first transformer-based artificial intelligence algorithm and second artificial intelligence algorithm allow for backpropagation through said first transformer-based artificial intelligence algorithm and second artificial intelligence algorithm.

15. The humanoid robot of claim 1, wherein the unified training framework uses a regression-based loss function.

16. The humanoid robot of claim 1, wherein the output data includes continuous motor control actions for at least 35 degrees of freedom.

17. A humanoid robot, comprising:
a torso;
a left arm assembly coupled to the torso;
a left wrist coupled to the left arm assembly;
a left end effector coupled to the left wrist and including: (i) a plurality of finger assemblies, and (ii) a thumb assembly with at least three degrees of freedom;
wherein the humanoid robot also includes:
(i) a first artificial intelligence algorithm configured to: (a) process data between 5 and 20 Hz, (b) receive natural language commands from a human and image data, and (c) provide processed data, and
(ii) a second artificial intelligence algorithm configured to: (a) process data between 50 and 300 Hz, (b) receive processed data from the first artificial intelligence algorithm, and robot state data, and (c) provide continuous motor action that is used to control an extent of the left wrist.

18. The humanoid robot of claim 17, wherein the left end effector includes at least twelve degrees of freedom distributed amongst the plurality of finger assemblies and the thumb assembly.

19. The humanoid robot of claim 17, wherein the first and second artificial intelligence algorithms are trained using a temporal offset to counterbalance inference latency differences.

20. The humanoid robot of claim 17, further comprising a head that is operably connected to the torso and that includes a screen configured to display non-verbal communication indicia.

21. The humanoid robot of claim 17, wherein a unified training framework is used to jointly train the first artificial intelligence algorithm and the second artificial intelligence algorithm.

22. The humanoid robot of claim 21, wherein the joint training of the first and second artificial intelligence algorithms includes training on a combination of: (i) video data, (ii) synthetic data, and (iii) robot teleoperation data.

23. The humanoid robot of claim 22, wherein the first artificial intelligence algorithm is a pre-trained vision-language model.

24. The humanoid robot of claim 21, wherein the joint training of the first and second artificial intelligence algorithms includes training on data collected from robots with different morphologies.

* * * * *